United States Patent
Kim et al.

(10) Patent No.: US 11,917,686 B2
(45) Date of Patent: Feb. 27, 2024

(54) METHOD FOR TRANSMITTING AND RECEIVING SIGNALS IN WIRELESS COMMUNICATION SYSTEM, AND DEVICE SUPPORTING SAME

(71) Applicant: LG ELECTRONICS INC., Seoul (KR)

(72) Inventors: Seonwook Kim, Seoul (KR); Sukhyon Yoon, Seoul (KR); Hyunsoo Ko, Seoul (KR); Byounghoon Kim, Seoul (KR); Suckchel Yang, Seoul (KR); Hanbyul Seo, Seoul (KR); Changhwan Park, Seoul (KR); Sangrim Lee, Seoul (KR); Hyunsu Cha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 45 days.

(21) Appl. No.: 17/605,518

(22) PCT Filed: Apr. 29, 2020

(86) PCT No.: PCT/KR2020/005649
§ 371 (c)(1),
(2) Date: Oct. 21, 2021

(87) PCT Pub. No.: WO2020/222519
PCT Pub. Date: Nov. 5, 2020

(65) Prior Publication Data
US 2022/0217774 A1    Jul. 7, 2022

(30) Foreign Application Priority Data
Apr. 30, 2019  (KR) .......... 10-2019-0050624

(51) Int. Cl.
H04W 74/08 (2009.01)
H04L 5/00 (2006.01)
H04W 56/00 (2009.01)

(52) U.S. Cl.
CPC ....... *H04W 74/0816* (2013.01); *H04L 5/0051* (2013.01); *H04W 56/0045* (2013.01); *H04W 74/0866* (2013.01)

(58) Field of Classification Search
CPC ............. H04W 24/10; H04W 74/0816; H04W 56/0045; H04W 74/0866; H04W 56/001;
(Continued)

(56) References Cited

U.S. PATENT DOCUMENTS 11,632,786 B2 * 4/2023 Xue ................. H04L 5/0092
370/330
2014/0079033 A1 * 3/2014 Bergstrom ............ H04L 5/0078
370/336
(Continued)

FOREIGN PATENT DOCUMENTS

CN       110087268 A  *  8/2019  ........ H04W 36/0007
KR    10-2009-0014978 A    2/2009
(Continued)

OTHER PUBLICATIONS

3GPP; TSG RAN; Physical layer procedures for shared spectrum channel access (Release 15)', 3GPP TS 37.213 V15.2.0, Mar. 27, 2019; Section 4.2.1.

*Primary Examiner* — Ayaz R Sheikh
*Assistant Examiner* — Louis Samara
(74) *Attorney, Agent, or Firm* — BRYAN CAVE LEIGHTON PAISNER LLP

(57) ABSTRACT

The present disclosure relates to a wireless communication system, and specifically provides a method and a device therefor, the method comprising: receiving first configura-
(Continued)

tion information for transmitting a sounding reference signal (SRS); performing a channel access procedure (CAP) on the basis of the first configuration information; acquiring a time period for the SRS transmission from an Nth symbol on the basis of a successful CAP in the Nth symbol; performing the SRS transmission within the time period; transmitting, within the time period, second configuration information for triggering positioning reference signal (PRS) transmission in at least one base station included in a cell group; and receiving a PRS from the at least one base station within the time period.

10 Claims, 27 Drawing Sheets

(58) Field of Classification Search
CPC ... H04L 5/0051; H04L 1/0026; H04B 7/0452; H04J 11/005
See application file for complete search history.

(56) References Cited

U.S. PATENT DOCUMENTS

| | | | |
|---|---|---|---|
| 2018/0110057 A1* | 4/2018 | Park | H04B 7/0452 |
| 2018/0367346 A1* | 12/2018 | Chen | H04L 1/0026 |
| 2018/0367358 A1* | 12/2018 | Baligh | H04J 11/005 |
| 2019/0132759 A1* | 5/2019 | Park | H04W 24/10 |
| 2020/0313816 A1* | 10/2020 | Sun | H04W 72/0446 |
| 2021/0045076 A1* | 2/2021 | Tomeba | H04W 56/001 |
| 2021/0058889 A1* | 2/2021 | Zhang | G01S 5/10 |

FOREIGN PATENT DOCUMENTS

| | | | | |
|---|---|---|---|---|
| KR | 10-2017-0078530 A | | 7/2017 | |
| KR | 20180089908 A | * | 4/2018 | |
| KR | 10-2018-0126560 A | | 11/2018 | |
| KR | 20180089908 A | * | 12/2018 | |
| WO | 2018/038904 A1 | | 3/2018 | |
| WO | WO-2018038904 A1 | * | 3/2018 | ........... G01S 5/0236 |

* cited by examiner (a) Carrier aggregation between L-band and U-band (b) Standalone U-band(s)

METHOD FOR TRANSMITTING AND RECEIVING SIGNALS IN WIRELESS COMMUNICATION SYSTEM, AND DEVICE SUPPORTING SAME

This application is the National Stage filing under 35 U.S.C. 371 of International Application No. PCT/KR2020/005649 filed on Apr. 29, 2020, which claims priority to Korean Patent Application Nos. 10-2019-0050624 filed on Apr. 30, 2019, the contents of which are all hereby incorporated by reference herein in their entirety.

TECHNICAL FIELD

The present disclosure relates to a wireless communication system, and more particularly to a method for transmitting and receiving signals in a wireless communication system supporting an unlicensed band, and a device for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An object of the present disclosure is to provide a method for efficiently transmitting and receiving radio frequency (RF) signals, and a device for the same.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

In accordance with a first aspect of the present disclosure, a method for operating a user equipment (UE) in a wireless communication system may include receiving first configuration information required for sounding reference signal (SRS) transmission, performing a channel access procedure (CAP) based on the first configuration information, based on a fact that the channel access procedure (CAP) is successfully performed in an N-th symbol, obtaining a time period required for the SRS transmission from the N-th symbol, performing the SRS transmission within the time period; within the time period, transmitting second configuration information for triggering positioning reference signal (PRS) transmission of at least one base station (BS) included in a cell group, and within the time period, receiving a positioning reference signal (PRS) from the at least one base station (BS).

In accordance with a second aspect of the present disclosure, a user equipment (UE) for use in a wireless communication system may include at least one processor; at least one transceiver, and at least one computer memory operatively connected to the at least one processor and the at least one transceiver, and configured to store instructions such that the at least one processor and the at least one transceiver perform specific operations by executing the instructions. The specific operations may include receiving first configuration information required for sounding reference signal (SRS) transmission; performing a channel access procedure (CAP) based on the first configuration information; based on a fact that the channel access procedure (CAP) is successfully performed in an N-th symbol, obtaining a time period required for the SRS transmission from the N-th symbol; performing the SRS transmission within the time period; within the time period, transmitting second configuration information for triggering positioning reference signal (PRS) transmission of at least one base station (BS) included in a cell group; and within the time period, receiving a positioning reference signal (PRS) from the at least one base station (BS).

In accordance with a third aspect of the present disclosure, a device for use in a wireless communication system may include at least one processor, and at least one memory operatively connected to the at least one processor, and configured to store instructions such that the at least one processor performs specific operations by executing the instructions. The specific operations may include receiving first configuration information required for sounding reference signal (SRS) transmission, performing a channel access procedure (CAP) based on the first configuration information, based on a fact that the channel access procedure (CAP) is successfully performed in an N-th symbol, obtaining a time period required for the SRS transmission from the N-th symbol, performing the SRS transmission within the time period, within the time period, transmitting second configuration information for triggering positioning reference signal (PRS) transmission of at least one base station (BS) included in a cell group, and within the time period, receiving a positioning reference signal (PRS) from the at least one base station (BS).

In accordance with a fourth aspect of the present disclosure, a processor-readable recording medium configured to store at least one instruction that enables at least one processor to perform specific operations by executing the instructions may include performing the specific operations. The specific operations may include receiving first configuration information required for sounding reference signal (SRS) transmission, performing a channel access procedure (CAP) based on the first configuration information, based on a fact that the channel access procedure (CAP) is successfully performed in an N-th symbol, obtaining a time period required for the SRS transmission from the N-th symbol, performing the SRS transmission within the time period, within the time period, transmitting second configuration information for triggering positioning reference signal (PRS) transmission of at least one base station (BS) included in a cell group, and within the time period, receiving a positioning reference signal (PRS) from the at least one base station (BS).

The second configuration information may include a channel access procedure (CAP) type of the at least one base station (BS), and information about a length of the time period.

The method may further include configuring frequency resources required for uplink (UL) transmission for the cell group, wherein the second configuration information is transmitted based on the frequency resources.

The cell group may include a serving cell and a neighboring cell.

Based on a fact that the at least one base station (BS) is a base station (BS) of the serving cell, the SRS transmission may be performed using a timing advanced (TA) value received from a base station (BS) of the serving cell.

Based on a fact that the at least one base station (BS) is a base station (BS) of the neighboring cell, the SRS transmission may be performed using a timing advanced (TA) value preconfigured for the cell group.

The first configuration information may include a start symbol index (M) of the SRS transmission, and the number (K) of symbols where the SRS transmission is configured.

Based on a fact that the N value is greater than the M value, the SRS transmission may be performed when a sequence shifted by an (N−M) value on a frequency axis is mapped to the N-th symbol.

Based on a fact that the N value is greater than the M value, the SRS transmission may be performed when a sequence mapped to a plurality of symbols ranging from an M-th symbol to an (N−1)-th symbol is punctured and the sequence is then mapped to a plurality of symbols ranging from an (M+K)-th symbol to a (K+N−1)-th symbol.

The user equipment (UE) may be configured to communicate with at least one of a network and another autonomous vehicle other than the UE.

The above-described aspects of the present disclosure are only some of the preferred embodiments of the present disclosure, and various embodiments reflecting the technical features of the present disclosure may be derived and understood from the following detailed description of the present disclosure by those skilled in the art.

Advantageous Effects

As is apparent from the above description, the embodiments of the present disclosure can efficiently transmit and receive signals in a wireless communication system.

The embodiments of the present disclosure can efficiently perform channel sensing in an unlicensed band.

The embodiments of the present disclosure can efficiently transmit and receive signals in consideration of channel sensing in an unlicensed band.

The effects that may be achieved with embodiments of the present disclosure are not limited to what has been particularly described hereinabove and other advantages not described herein will be more clearly understood by persons skilled in the art from the following detailed description of the present disclosure. That is, unintended effects in implementing the present disclosure may also be derived by those skilled in the art from the embodiments of the present disclosure.

DESCRIPTION OF DRAWINGS

The accompanying drawings, which are included to provide a further understanding of the disclosure, illustrate embodiments of the present disclosure and together with the description serve to explain the principle of the present disclosure.

FIG. 14 is a diagram illustrating examples related to a PRS transmission configuration applicable to the embodiments of the present disclosure.

FIG. 16 is a diagram illustrating an example related to an SRS transmission configuration applicable to the embodiments of the present disclosure.

BEST MODE

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

As more and more communication devices require larger communication capacities, the need for enhanced mobile broadband communication relative to the legacy radio access technologies (RATs) has emerged. Massive machine type communication (MTC) providing various services to inter-connected multiple devices and things at any time in any place is one of significant issues to be addressed for next-generation communication. A communication system design in which services sensitive to reliability and latency are considered is under discussion as well. As such, the introduction of the next-generation radio access technology (RAT) for enhanced mobile broadband communication (eMBB), massive MTC (mMTC), and ultra-reliable and low latency communication (URLLC) is being discussed. For convenience, this technology is called NR or New RAT in the present disclosure.

To clarify the explanation, 3GPP NR is mainly described, by which the technical ideas of the present disclosure are non-limited.

The General of 3GPP System

In a wireless access system, a user equipment (UE) receives information from a base station (BS) on DL and transmits information to the BS on UL. The information transmitted and received between the UE and the BS includes general data and various types of control information. There are many physical channels according to the types/usages of information transmitted and received between the BS and the UE.

Figure 1:
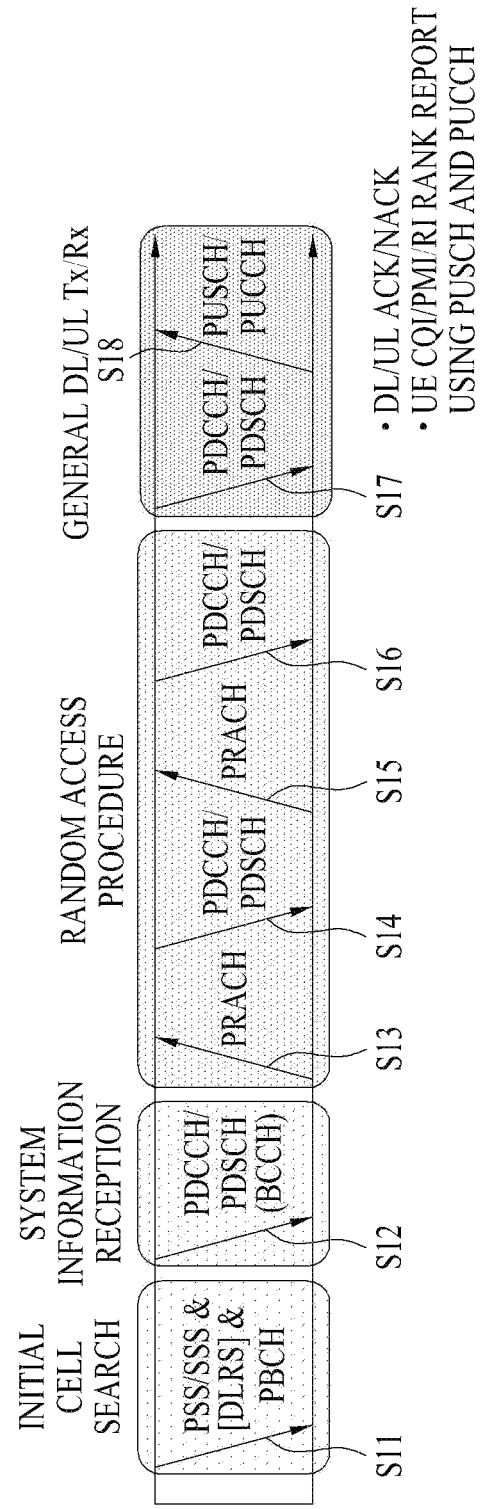
FIG. 1 illustrates physical channels and a general signal transmission method using the physical channels in a 3rd generation partnership project (3GPP) system as an exemplary wireless communication system.

FIG. 1 illustrates physical channels and a general signal transmission method using the physical channels in a 3GPP system.

When a UE is powered on or enters a new cell, the UE performs initial cell search (S11). The initial cell search involves acquisition of synchronization to a BS. For this purpose, the UE receives a synchronization signal block (SSB) from the BS. The SSB includes a primary synchronization signal (PSS), a secondary synchronization signal (SSS), and a physical broadcast channel (PBCH). The UE synchronizes its timing to the BS and acquires information such as a cell identifier (ID) based on the PSS/SSS. Further, the UE may acquire information broadcast in the cell by receiving the PBCH from the BS. During the initial cell search, the UE may also monitor a DL channel state by receiving a downlink reference signal (DL RS).

After the initial cell search, the UE may acquire more detailed system information by receiving a physical downlink control channel (PDCCH) and a physical downlink shared channel (PDSCH) corresponding to the PDCCH (S12).

Subsequently, to complete connection to the BS, the UE may perform a random access procedure with the BS (S13 to S16). Specifically, the UE may transmit a preamble on a physical random access channel (PRACH) (S13) and may receive a PDCCH and a random access response (RAR) for the preamble on a PDSCH corresponding to the PDCCH (S14). The UE may then transmit a physical uplink shared channel (PUSCH) by using scheduling information in the RAR (S15), and perform a contention resolution procedure including reception of a PDCCH and a PDSCH signal corresponding to the PDCCH (S16).

When the random access procedure is performed in two steps, steps S13 and S15 may be performed as one step (in which Message A is transmitted by the UE), and steps S14 and S16 may be performed as one step (in which Message B is transmitted by the BS).

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure. Control information that the UE transmits to the BS is generically called uplink control information (UCI). The UCI includes a hybrid automatic repeat and request acknowledgement/negative acknowledgement (HARQ-ACK/NACK), a scheduling request (SR), channel state information (CSI), and so on. The CSI includes a channel quality indicator (CQI), a precoding matrix index (PMI), a rank indication (RI), and so on. In general, UCI is transmitted on a PUCCH. However, if control information and data should be transmitted simultaneously, the control information and the data may be transmitted on a PUSCH. In addition, the UE may transmit the UCI aperiodically on the PUSCH, upon receipt of a request/command from a network.

A User Equipment (UE) may perform a network access procedure to implement the described/proposed procedures and/or methods of the present disclosure. For example, while performing an access to a network (e.g., a Base Station (BS)), a UE can receive and store system information and configuration information necessary to perform the described/proposed procedures and/or methods described later in memory. Configuration informations necessary for the present disclosure may be received through signaling of higher layers (e.g., RRC layer, Medium Access Control (MAC) layer, etc.).

Figure 2:
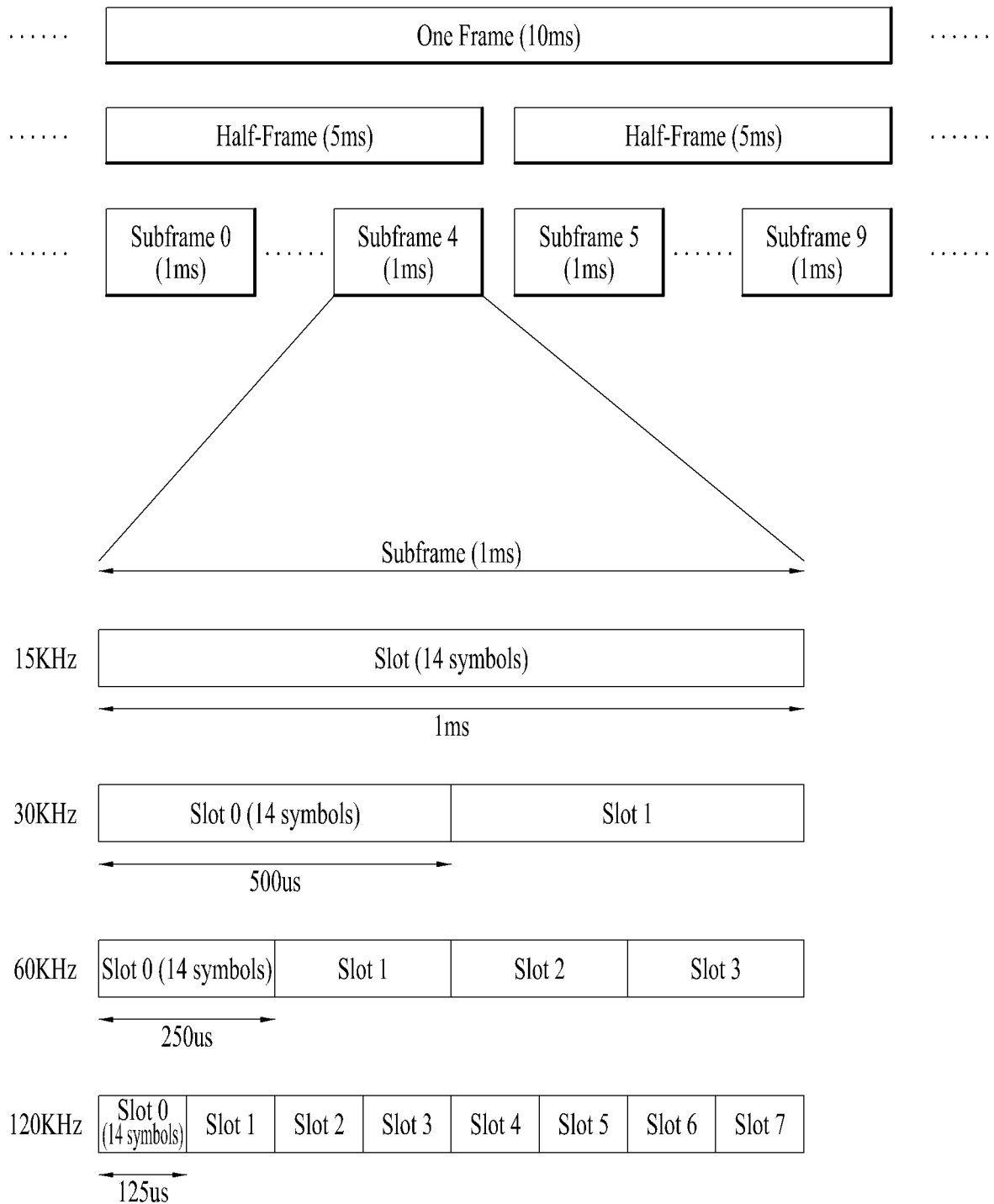
FIG. 2 illustrates a radio frame structure.

FIG. 2 illustrates a radio frame structure.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS (15*2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*Nslotsymb: number of symbols in a slot
*Nframe,uslot: number of slots in a frame
*Nsubframe,uslot: number of slots in a subframe Table 2 illustrates that the number of symbols per slot, the number of slots per frame, and the number of slots per subframe vary according to SCSs in an extended CP case.

TABLE 2

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

The frame structure is merely an example, and the number of subframes, the number of slots, and the number of symbols in a frame may be changed in various manners.

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

Figure 3:
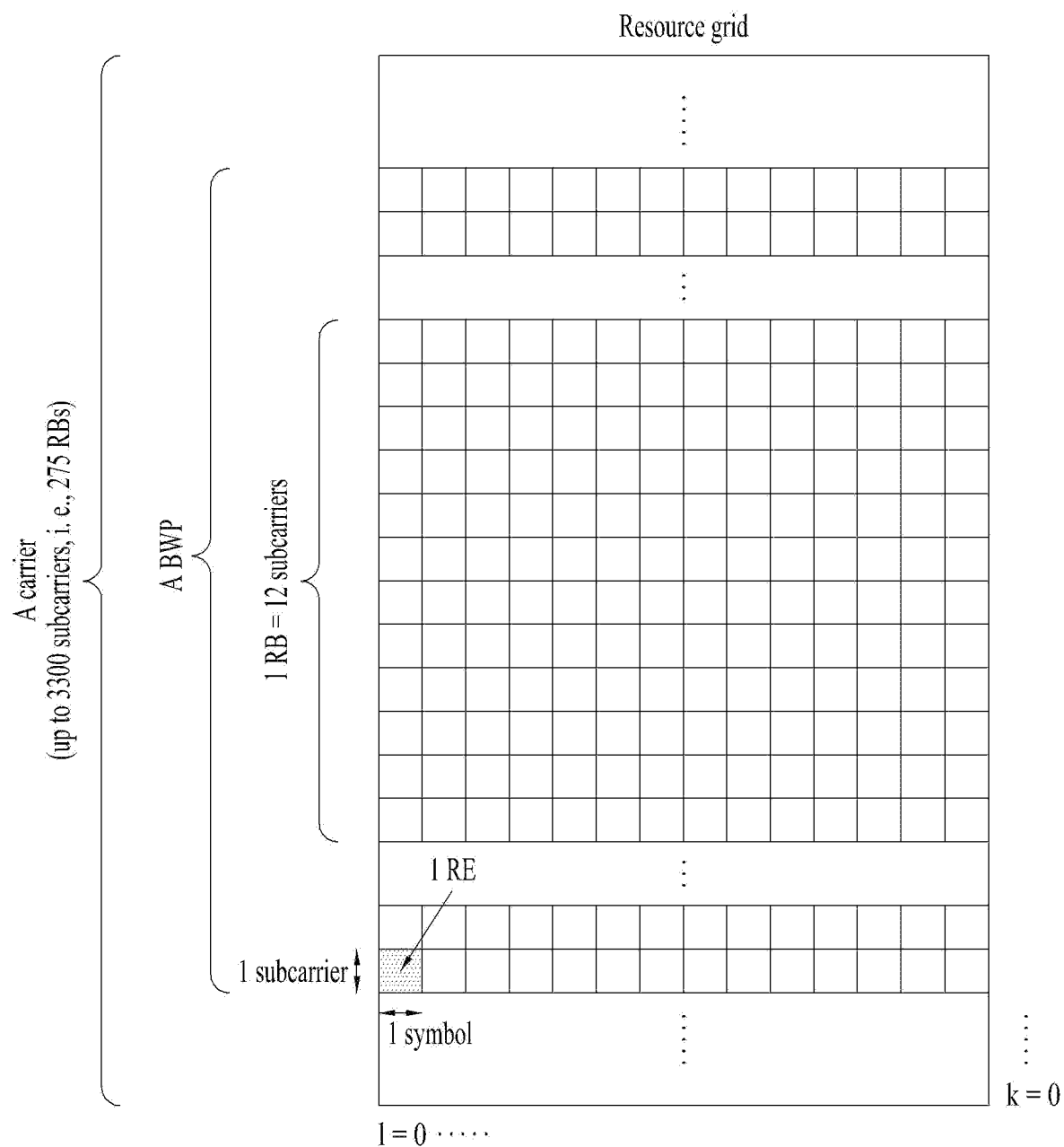
FIG. 3 illustrates a resource grid during the duration of a slot.

FIG. 3 illustrates a resource grid during the duration of one slot.

A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

Figure 4:
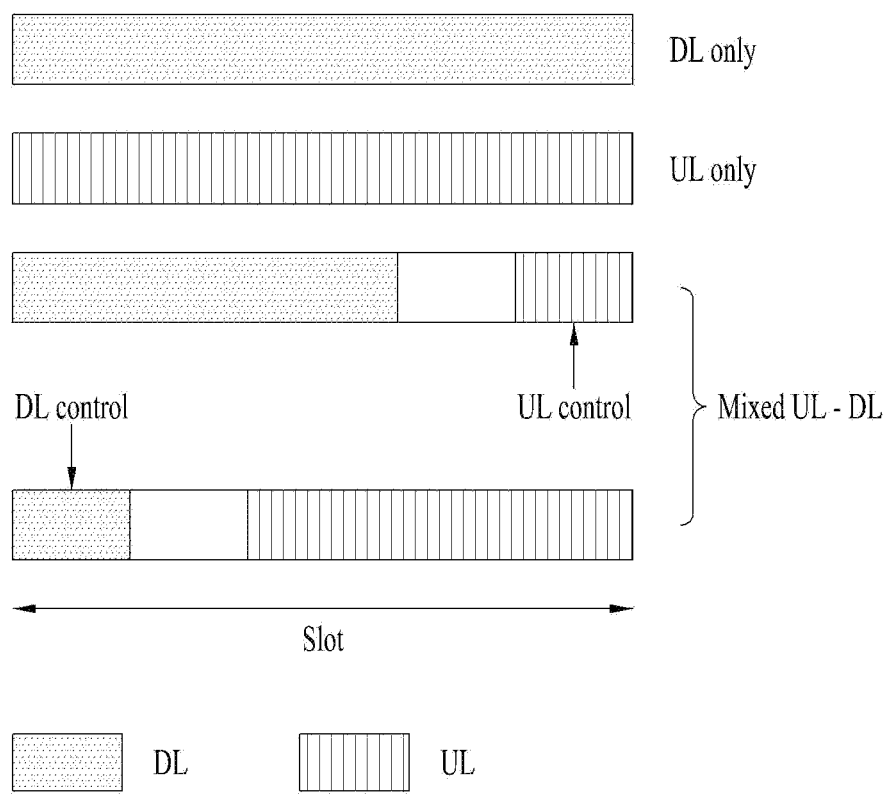
FIG. 4 illustrates a self-contained slot structure.

FIG. 4 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

Figure 5:
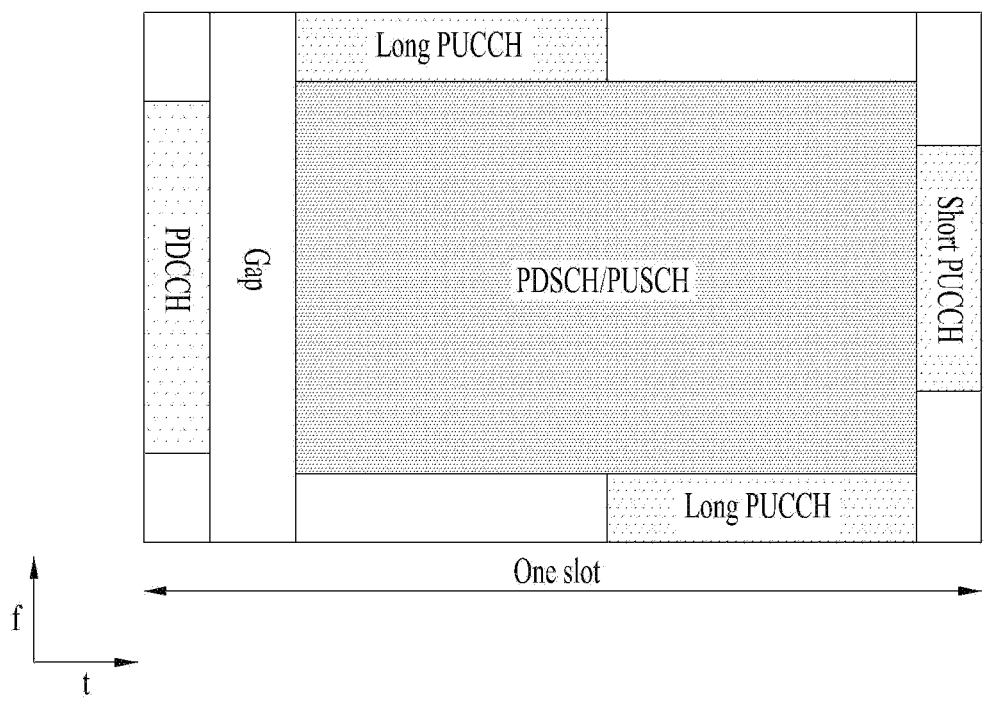
FIG. 5 illustrates mapping of physical channels in a self-contained slot.

1. DL only configuration
2. UL only configuration
3. Mixed UL-DL configuration
    DL region+Guard period (GP)+UL control region
    DL control region+GP+UL region
    DL region: (i) DL data region, (ii) DL control region+ DL data region
    UL region: (i) UL data region, (ii) UL data region+UL control region FIG. 5 illustrates mapping of physical channels in a self-contained slot. The PDCCH may be transmitted in the DL control region, and the PDSCH may be transmitted in the DL data region. The PUCCH may be transmitted in the UL control region, and the PUSCH may be transmitted in the UL data region. The GP provides a time gap in the process of the UE switching from the transmission mode to the reception mode or from the reception mode to the transmission mode. Some symbols at the time of switching from DL to UL within a subframe may be configured as the GP.

Now, a detailed description will be given of physical channels.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PDCCH may include 1, 2, 4, 8, or 16 control channel elements (CCEs) depending on the aggregation level (AL). The CCE is a logical allocation unit for providing the PDCCH with a predetermined coding rate based on the state of a radio channel. The PDCCH is transmitted in a control resource set (CORESET). The CORESET is defined as a set of REGs with a given numerology (e.g., SCS, CP length, etc.). A plurality of CORESETs for one UE may overlap in the time/frequency domain. The CORESET may be configured by system information (e.g., master information block (MIB)) or UE-specific higher layer signaling (e.g., radio resource control (RRC) layer signaling). Specifically, the numbers of RBs and OFDM symbols (up to three OFDM symbols) in the CORESET may be configured by higher layer signaling.

To receive/detect the PDCCH, the UE monitors PDCCH candidates. A PDCCH candidate refers to CCE(s) that the UE should monitor for PDCCH detection. Each PDCCH candidate is defined by 1, 2, 4, 8, or 16 CCEs depending on the AL. Here, monitoring includes (blind) decoding of PDCCH candidates. A set of PDCCH candidates monitored by the UE are defined as a PDCCH search space (SS). The SS may include a common search space (CSS) or a UE-specific search space (USS). The UE may obtain DCI by monitoring PDCCH candidates in one or more SSs, which are configured by an MIB or higher layer signaling. Each CORESET is associated with one or more SSs, and each SS is associated with one CORESET. The SS may be defined based on the following parameters.

controlResourceSetId: this indicates the CORESET related to the SS.
monitoringSlotPeriodicityAndOffset: this indicates a PDCCH monitoring periodicity (on a slot basis) and a PDCCH monitoring period offset (on a slot basis).
monitoringSymbolsWithinSlot: this indicates PDCCH monitoring symbols in a slot (e.g., first symbol(s) in the CORESET).
nrofCandidates: this denotes the number of PDCCH candidates for each AL={1, 2, 4, 8, 16} (one of 0, 1, 2, 3, 4, 5, 6, and 8).
An occasion (e.g., time/frequency resource) for monitoring PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbols(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDCCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

The PDSCH delivers DL data (e.g., a downlink shared channel (DL-SCH) transport block (TB)) and adopts a modulation scheme such as quadrature phase shift keying (QPSK), 16-ary quadrature amplitude modulation (16 QAM), 64-ary QAM (64 QAM), or 256-ary QAM (256 QAM). A TB is encoded to a codeword. The PDSCH may deliver up to two codewords. The codewords are individually subjected to scrambling and modulation mapping, and modulation symbols from each codeword are mapped to one or more layers. An OFDM signal is generated by mapping each layer together with a DMRS to resources, and transmitted through a corresponding antenna port.

The PUCCH delivers uplink control information (UCI). The UCI includes the following information.

SR: information used to request UL-SCH resources.

HARQ-ACK: a response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term "HARQ-ACK is interchangeably used with HARQ ACK/NACK and ACK/NACK.

CSI: feedback information for a DL channel. Multiple input multiple output (MIMO)-related feedback information includes an RI and a PMI.

Table 5 illustrates exemplary PUCCH formats. PUCCH formats may be divided into short PUCCHs (Formats 0 and 2) and long PUCCHs (Formats 1, 3, and 4) based on PUCCH transmission durations.

TABLE 5

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in PUCCH resources for a corresponding SR configuration.

PUCCH format 1 conveys UCI of up to 2 bits and modulation symbols of the UCI are spread with an orthogonal cover code (OCC) (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 2-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 include an OCC. Modulation symbols are transmitted in TDM with the DMRS.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. A PUSCH transmission may be dynamically scheduled by a UL grant in DCI, or semi-statically scheduled by higher-layer (e.g., RRC) signaling (and/or Layer 1 (L1) signaling such as a PDCCH) (configured scheduling or configured grant). The PUSCH transmission may be performed in a codebook-based or non-codebook-based manner.

Figure 6:
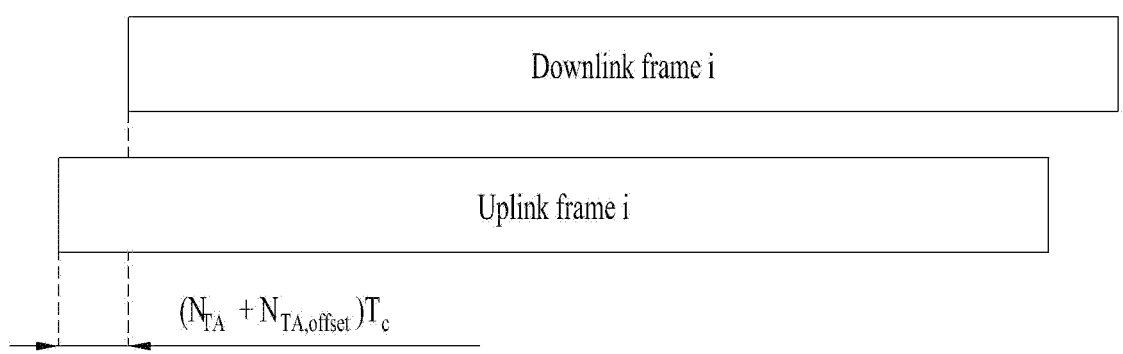
FIG. 6 is a diagram illustrating an example of the UL/DL (uplink/downlink) timing relationship applicable to various embodiments of the present disclosure.

FIG. 6 is a diagram illustrating an example of the UL/DL (uplink/downlink) timing relationship applicable to various embodiments of the present disclosure.

Referring to FIG. 6, prior to transmission of a downlink frame corresponding to an uplink frame (i), the UE may begin to transmit data from a specific time point (TTA seconds) (where $T_{TA}=(N_{TA}+N_{TA\ offset})\times T_c$). However, exceptionally, 'TTA=0' may be applied to Message-A (msgA) transmission on PUSCH. The respective parameters can be defined as shown in Table 6.

$N_{TA}$: In case of random access response, a timing advance command [11, TS 38.321], $T_A$, for a TAG indicates $N_{TA}$ values by index values of $T_A=0, 1, 2, \ldots, 3846$, where an amount of the time alignment for the TAG with SCS of $2^\mu \cdot 15$ kHz is $N_{TA}=T_A \cdot 16 \cdot 64/2^\mu$. $N_{TA}$ is defined in [4, TS 38.211] and is relative to the SCS of the first uplink transmission from the UE after the reception of the random access response. In other cases, a timing advance command [11, TS 38.321], $T_A$, for a TAG indicates adjustment of a current $N_{TA}$ value, $N_{TA\_old}$, to the new $N_{TA}$ value, $N_{TA\_new}$, by index values of $T_A=0, 1, 2, \ldots, 63$, where for a SCS of $2^\mu \cdot 15$ kHz, $N_{TA\_new}=N_{TA\_old}+(T_A-31) \cdot 16 \cdot 64/2^\mu$.

TABLE 6

| Frequency range and band of cell used for uplink transmission | $N_{TA\ offset}$ (Unit: Tc) |
|---|---|
| FR1 FDD band without LTE-NR coexistence case or FR1 TDD band without LTE-NR coexistence case | 25600 (Note 1) |
| FR1 FDD band with LTE-NR coexistence case | 0 (Note 1) |
| FR1 TDD band with LTE-NR coexistence case | 39936 (Note 1) |
| FR2 | 13792 |

Note 1:
The UE identifies $N_{TA\ offset}$ based on the information n-TimingAdvanceOffset according to [2]. If UE is not provided with the information n-TimingAdvanceOffset, the default value of $N_{TA\ offset}$ is set as 25600 for FR1 band. In case of multiple UL carriers in the same TAG, UE expects that the same value of n-TimingAdvanceOffset is provided for all the UL carriers according to section 4.2 in [3] and the value 39936 of $N_{TA\ offset}$ can also be provided for a FDD serving cell.

Recently, the 3GPP standardization organization is in the process of standardizing a 5G wireless communication system named NR (New RAT). The 3GPP NR system supports a plurality of logical networks in a single physical system and is designed to support services (e.g., eMBB, mMTC, URLLC, etc.) having various requirements by changing the transmission time interval (TTI) and OFDM numerology (e.g., OFDM symbol duration, subcarrier spacing (SCS)). As data traffic has rapidly increased due to the recent emergence of smart devices, utilizing unlicensed bands for cellular communication in the 3GPP NR system is considered as in the licensed-assisted access (LAA) of the existing 3GPP LTE system. However, unlike the LAA, an NR cell in the unlicensed band (hereinafter, NR UCell) aims at a stand-alone (SA) operation. As an example, PUCCH, PUSCH, and PRACH transmissions may be supported in the NR UCell.

In an NR system to which various embodiments of the present disclosure are applicable, a frequency resource of up to 400 MHz may be allocated/supported per one component carrier (CC). When a UE configured operate in such a wideband CC always operates with a radio frequency (RF) module for the entire CCs turned on, battery consumption of the UE may increase.

Alternatively, considering various use cases (e.g., eMBB, URLLC, mMTC, and so on) operating within a single wideband CC, a different numerology (e.g., SCS) may be supported for each frequency band within the CC.

Alternatively, each UE may have a different maximum bandwidth capability.

In this regard, the BS may indicate to the UE to operate only in a partial bandwidth instead of the total bandwidth of the wideband CC. The partial bandwidth may be defined as a bandwidth part (BWP).

A BWP may be a subset of contiguous RBs on the frequency axis. One BWP may correspond to one numerology (e.g., SCS, CP length, slot/mini-slot duration, and so on).

Unlicensed Band System

Figure 7:
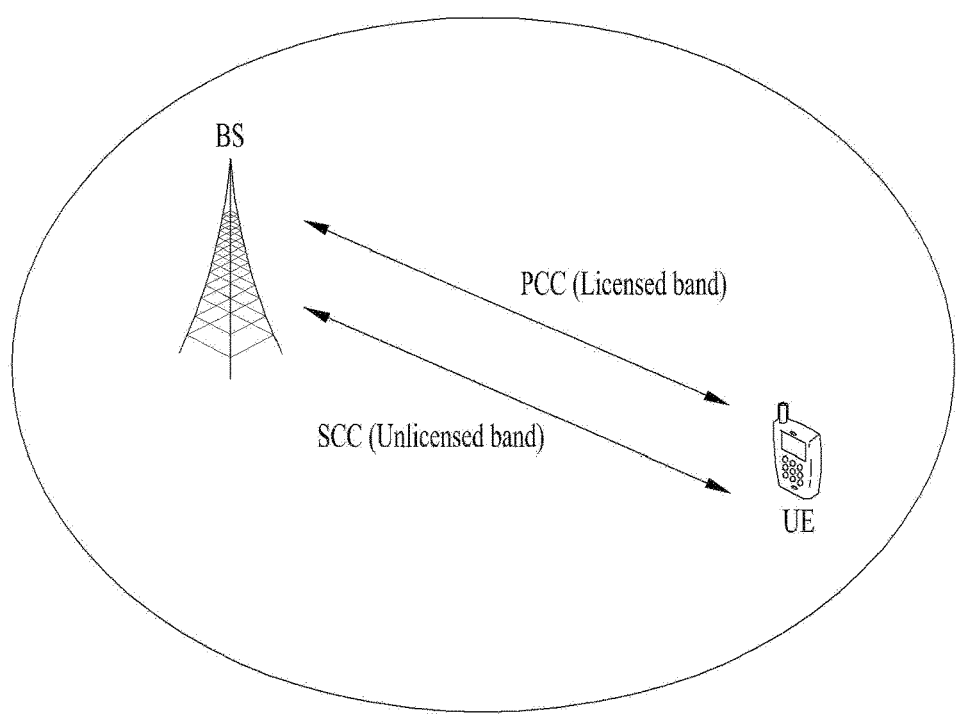
FIG. 7 illustrates a wireless communication system supporting an unlicensed band.
Figure 7:
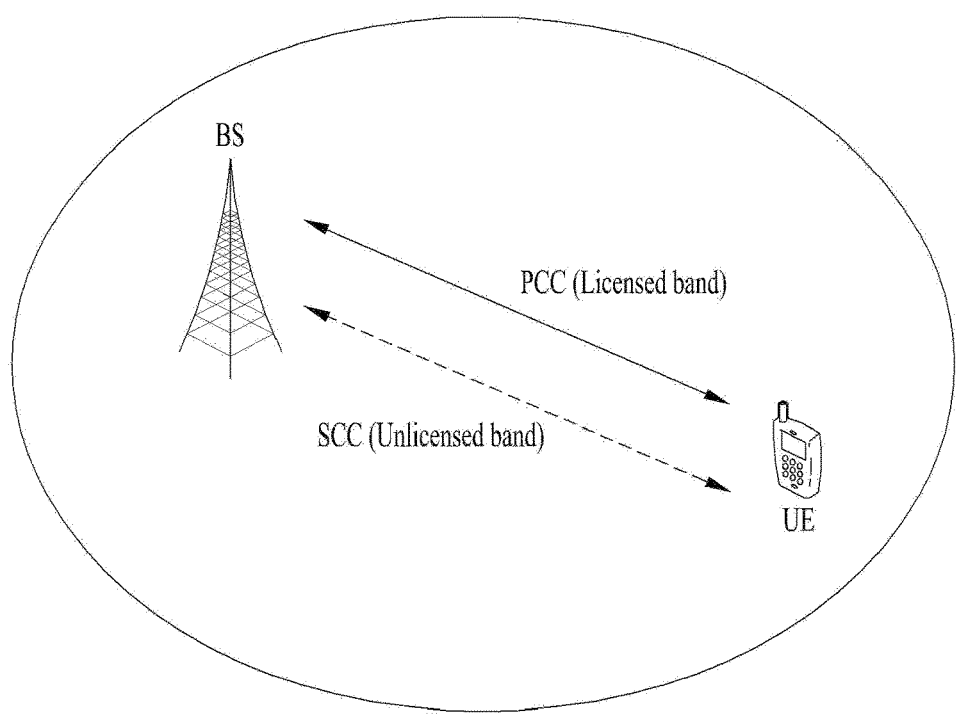

FIG. 7 illustrates an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

Figure 8:
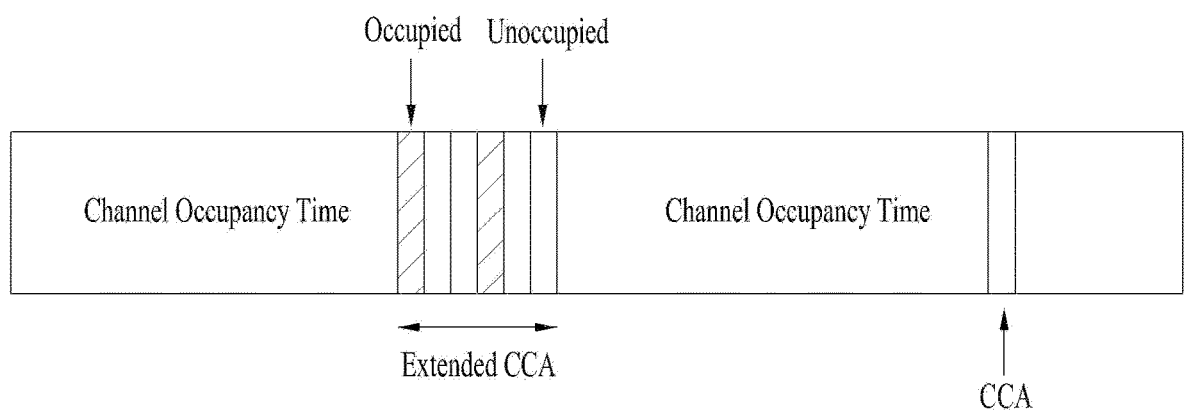
FIG. 8 illustrates an exemplary method of occupying resources in an unlicensed band.

When carrier aggregation (CA) is supported, one UE may use a plurality of aggregated cells/carriers to exchange a signal with the BS. When one UE is configured with a plurality of CCs, one CC may be set to a primary CC (PCC), and the remaining CCs may be set to secondary CCs (SCCs). Specific control information/channels (e.g., CSS PDCCH, PUCCH) may be transmitted and received only on the PCC. Data may be transmitted and received on the PCC/SCC. FIG. 8 (a) shows a case in which the UE and BS exchange signals on both the LCC and UCC (non-stand-alone (NSA) mode). In this case, the LCC and UCC may be set to the PCC and SCC, respectively. When the UE is configured with a plurality of LCCs, one specific LCC may be set to the PCC, and the remaining LCCs may be set to the SCC. FIG. 7(a) corresponds to the LAA of the 3GPP LTE system. FIG. 7(b) shows a case in which the UE and BS exchange signals on one or more UCCs with no LCC (stand-alone (SA) mode). In this case, one of the UCCs may be set to the PCC, and the remaining UCCs may be set to the SCC. Both the NSA mode and SA mode may be supported in the U-band of the 3GPP NR system.

FIG. 8 illustrates an exemplary method of occupying resources in an unlicensed band. According to regional regulations for the U-band, a communication node in the U-band needs to determine whether a corresponding channel is used by other communication node(s) before transmitting a signal. Specifically, the communication node may perform carrier sensing (CS) before transmitting the signal so as to check whether the other communication node(s) perform signal transmission. When the other communication node(s) perform no signal transmission, it is said that clear channel assessment (CCA) is confirmed. When a CCA threshold is predefined or configured by higher layer signaling (e.g., RRC signaling), if the detected channel energy is higher than the CCA threshold, the communication node may determine that the channel is busy. Otherwise, the communication node may determine that the channel is idle. When it is determined that the channel is idle, the communication node may start the signal transmission in the UCell. The Wi-Fi standard (802.11ac) specifies a CCA threshold of 62 dBm for non-Wi-Fi signals and a CCA threshold of −82 dBm for Wi-Fi signals. The sires of processes described above may be referred to as Listen-Before-Talk (LBT) or a channel access procedure (CAP). The LBT may be interchangeably used with the CAP.

In Europe, two LBT operations are defined: frame based equipment (FBE) and load based equipment (LBE). In FBE, one fixed frame is made up of a channel occupancy time (e.g., 1 to 10 ms), which is a time period during which once a communication node succeeds in channel access, the communication node may continue transmission, and an idle period corresponding to at least 5% of the channel occupancy time, and CCA is defined as an operation of observing a channel during a CCA slot (at least 20 us) at the end of the idle period. The communication node performs CCA periodically on a fixed frame basis. When the channel is unoccupied, the communication node transmits during the channel occupancy time, whereas when the channel is occupied, the communication node defers the transmission and waits until a CCA slot in the next period.

In LBE, the communication node may set q∈{4, 5, . . . , 32} and then perform CCA for one CCA slot. When the channel is unoccupied in the first CCA slot, the communication node may secure a time period of up to $(13/32)q$ ms and transmit data in the time period. When the channel is occupied in the first CCA slot, the communication node randomly selects N∈{1, 2, . . . , q}, stores the selected value as an initial value, and then senses a channel state on a CCA slot basis. Each time the channel is unoccupied in a CCA slot, the communication node decrements the stored counter value by 1. When the counter value reaches 0, the communication node may secure a time period of up to $(13/32)q$ ms and transmit data.

The BS may perform one of the following unlicensed band access procedures (e.g., channel access procedures (CAPs)) to transmit a DL signal in the unlicensed band.

(1) First DL CAP Method

Figure 9:
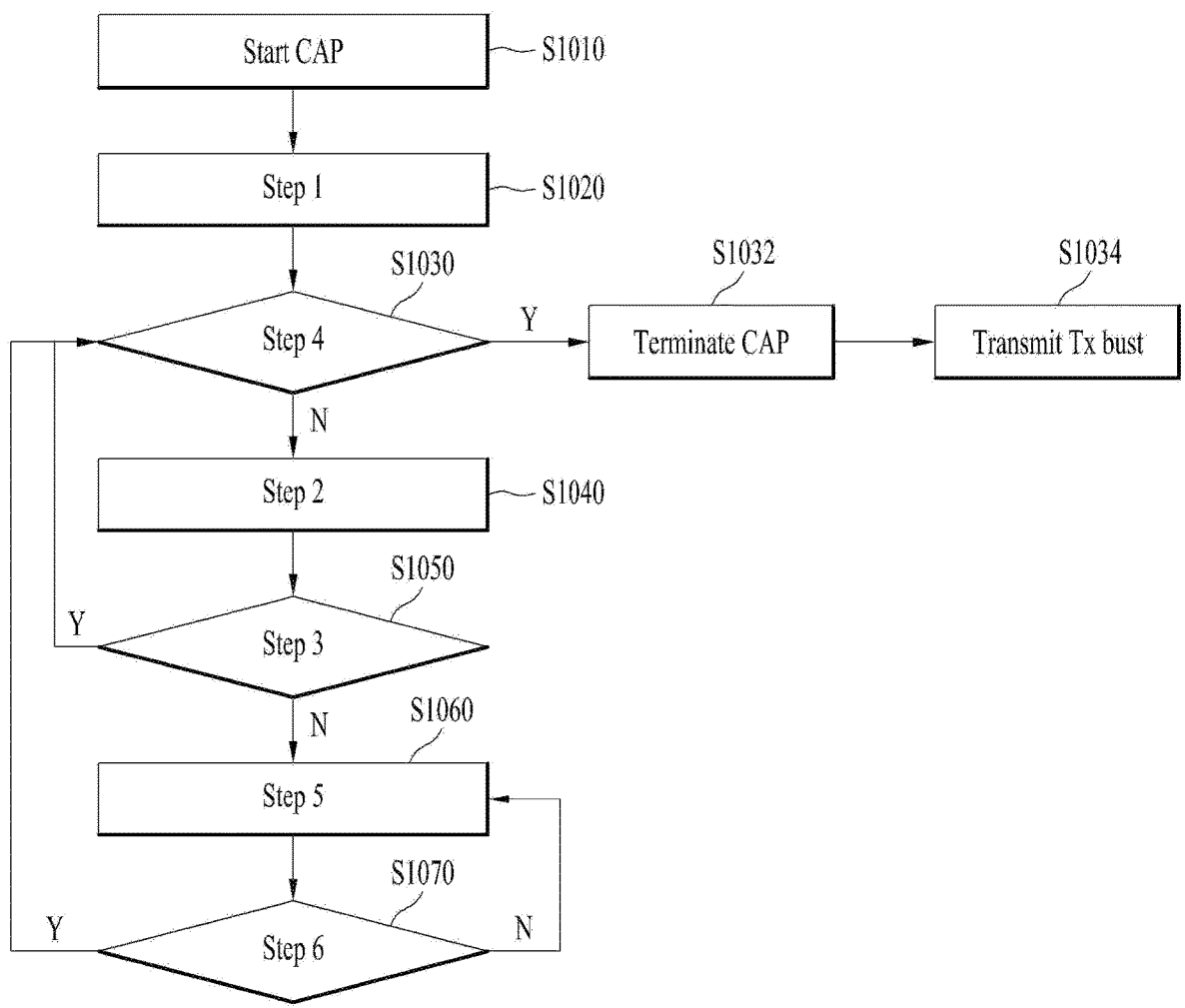
FIG. 9 illustrates an exemplary channel access procedure of a UE for DL signal transmission in an unlicensed band applicable to the present disclosure.

FIG. 9 is a flowchart illustrating a DL CAP for DL signal transmission in an unlicensed band, performed by a BS.

For DL signal transmission (e.g., transmission of a DL signal such as a PDSCH/PDCCH/enhanced PDCCH (EPDCCH)), the BS may initiate a CAP (S1010). The BS may randomly select a backoff counter N within a contention window (CW) according to step 1. N is set to an initial value Ninit (S1020). Ninit is a random value selected from the values between 0 and CWp. Subsequently, when the backoff counter value N is 0 according to step 4 (S1030; Y), the BS terminates the CAP (S1032). The BS may then perform a Tx burst transmission including transmission of a PDSCH/PDCCH/EPDCCH (S1034). On the contrary, when the backoff counter value N is not 0 (S1030; N), the BS decrements the backoff counter value by 1 according to step 2 (S1040). Subsequently, the BS checks whether the channel of U-cell(s) is idle (S1050). If the channel is idle (S1050; Y), the BS determines whether the backoff counter value is 0 (S1030). On the contrary, when the channel is not idle, that is, the channel is busy (S1050; N), the BS determines whether the channel is idle during a longer defer duration Td (25 usec or longer) than a slot duration (e.g., 9 usec) according to step 5 (S1060). If the channel is idle during the defer duration (S1070; Y), the BS may resume the CAP. The defer duration may include a 16-usec duration and the immediately following mp consecutive slot durations (e.g., each being 9 usec). On the contrary, if the channel is busy during the defer duration (S1070; N), the BS re-checks whether the channel of the U-cell(s) is idle during a new defer duration by performing step S1060 again.

Table 7 illustrates that mp, a minimum CW, a maximum CW, a maximum channel occupancy time (MCOT), and an allowed CW size applied to a CAP vary according to channel access priority classes.

TABLE 7

| Channel Access Priority Class (p) | $m_p$ | $CW_{min,p}$ | $CW_{max,p}$ | $T_{ulcot,p}$ | Allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

A CW size applied to the first DL CAP may be determined in various methods. For example, the CW size may be adjusted based on the probability of HARQ-ACK values corresponding to PDSCH transmission(s) within a predetermined time period (e.g., a reference TU) being determined as NACK. In the case where the BS performs a DL transmission including a PDSCH that is associated with a channel access priority class p on a carrier, if the probability z of HARQ-ACK values corresponding to PDSCH transmission(s) in reference subframe k (or reference slot k) being determined as NACK is at least 80%, the BS increases a CW value set for each priority class to the next higher allowed value. Alternatively, the BS maintains the CW value set for each priority class to be an initial value. A reference subframe (or reference slot) may be defined as the starting subframe (or slot) of the most recent transmission on the carrier made by the BS, for which at least some HARQ-ACK feedback is expected to be available.

(2) Second DL CAP Method

The BS may perform a DL signal transmission (e.g., a signal transmission including a discovery signal transmission, without a PDSCH) in an unlicensed band according to the second DL CAP method described below.

When the signal transmission duration of the BS is equal to or less than 1 ms, the BS may transmit a DL signal (e.g., a signal including a discovery signal without a PDSCH) in the unlicensed band immediately after sensing the channel to be idle for at least a sensing duration Tdrs=25 us. Tdrs includes a duration Tf (=16 us) following one sensing slot duration Tsl (=9 us).

(3) Third DL CAP Method

The BS may perform the following CAPs for DL signal transmission on multiple carriers in an unlicensed band.

1) Type A: The BS performs a CAP for multiple carriers based on a counter N defined for each carrier (a counter N considered in a CAP) and performs a DL signal transmission based on the CAP.

Type A1: The counter N for each carrier is determined independently, and a DL signal is transmitted on each carrier based on the counter N for the carrier.

Type A2: The counter N of a carrier with a largest CW size is set for each carrier, and a DL signal is transmitted on each carrier based on the counter N for the carrier.

2) Type B: The BS performs a CAP based on a counter N only for a specific one of a plurality of carriers and performs a DL signal transmission by checking whether the channels of the other carriers are idle before a signal transmission on the specific carrier.

Type B1: A single CW size is defined for a plurality of carriers, and the BS uses the single CW size in a CAP based on the counter N for a specific carrier.

Type B2: A CW size is defined for each carrier, and the largest of the CW sizes is used in determining Ninit for a specific carrier.

Further, the UE performs a contention-based CAP for a UL signal transmission in an unlicensed band. The UE performs a Type 1 or Type 2 CAP for the UL signal transmission in the unlicensed band. In general, the UE may perform a CAP (e.g., Type 1 or Type 2) configured for a UL signal transmission by the BS.

(1) Type 1 UL CAP Method

Figure 10:
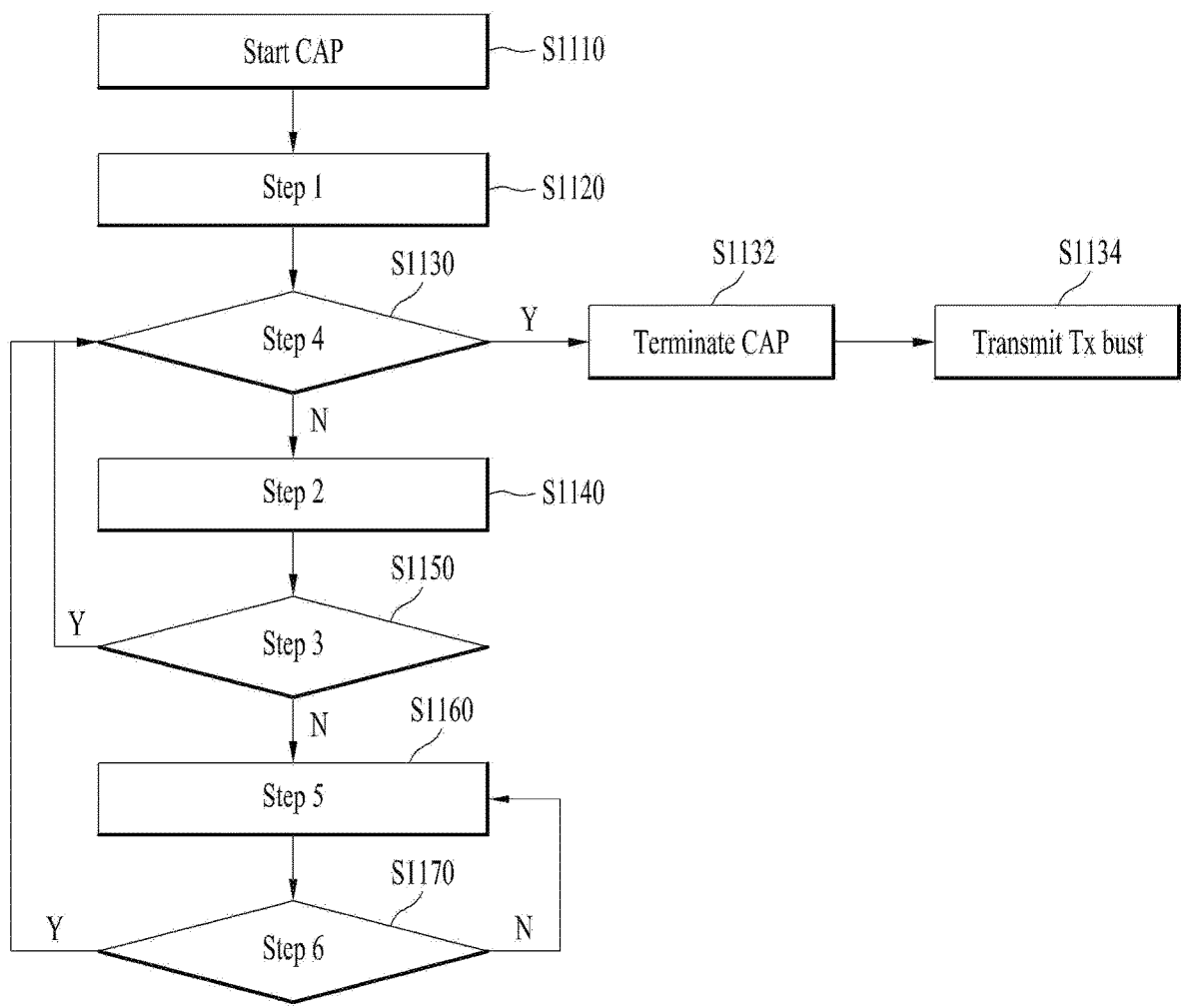
FIG. 10 illustrates an exemplary channel access procedure of a UE for UL signal transmission in an unlicensed band applicable to the present disclosure.

FIG. 10 is a flowchart illustrating UE's Type 1 CAP operation for UL signal transmission.

To transmit a signal in the U-band, the UE may initiate a CAP (S1110). The UE may randomly select a backoff counter N within a contention window (CW) according to step 1. In this case, N is set to an initial value Ninit (S1120). Ninit may have a random value between 0 and CWp. If it is determined according to step 4 that the backoff counter value (N) is 0 (YES in S1130), the UE terminates the CAP (S1132). Then, the UE may perform Tx burst transmission (S1134). If the backoff counter value is non-zero (NO in S1130), the UE decreases the backoff counter value by 1 according to step 2 (S1140). The UE checks whether the channel of U-cell(s) is idle (S1150). If the channel is idle (YES in S1150), the UE checks whether the backoff counter value is 0 (S1130). On the contrary, if the channel is not idle in S1150, that is, if the channel is busy (NO in S1150), the UE checks whether the corresponding channel is idle for a defer duration Td (longer than or equal to 25 µs), which is longer than a slot duration (e.g., 9 µs), according to step 5 (S1160). If the channel is idle for the defer duration (YES in S1170), the UE may resume the CAP. Here, the defer duration may include a duration of 16 µs and mp consecutive slot durations (e.g., 9 µs), which immediately follows the duration of 16 µs. If the channel is busy for the defer duration (NO in S1170), the UE performs step S1160 again to check whether the channel is idle for a new defer duration.

Table 8 shows that the values of mp, a minimum CW, a maximum CW, an MCOT, and allowed CW sizes, which are applied to the CAP, vary depending on channel access priority classes.

TABLE 8

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

The size of a CW applied to the Type 1 UL CAP may be determined in various ways. For example, the CW size may be adjusted depending on whether the value of a new data indicator (NDI) for at least one HARQ process associated with HARQ_ID_ref, which is the HARQ process ID of a UL-SCH in a predetermined time period (e.g., a reference TU), is toggled. When the UE performs signal transmission using the Type 1 CAP associated with the channel access priority class p on a carrier, if the value of the NDI for the at least one HARQ process associated with HARQ_ID_ref is toggled, the UE may set CWp to CWmin, p for every priority class p∈{1, 2, 3, 4}. Otherwise, the UE may increase CWp for every priority class p∈{1, 2, 3, 4} to a next higher allowed value.

A reference subframe (or reference slot) nref may be determined as follows.

When the UE receives a UL grant in a subframe (or slot) ng and performs transmission including a UL-SCH, which has no gaps and starts from a subframe (or slot) n0, in subframes (or slots) n0, n1, . . . , nw (here, the subframe (or slot) nw is the most recent subframe (or slot) before a subframe ng-3 in which the UE has transmitted the UL-SCH based on the Type 1 CAP), the reference subframe (or slot) nref may be the subframe n0.

(2) Type 2 UL CAP Method

When the UE uses the Type 2 CAP to transmit a UL signal (including the PUSCH) in a U-band, the UE may transmit the UL signal (including the PUSCH) in the U-band immediately after sensing that the channel is idle at least for a sensing period Tshort_ul of 25 us. Tshort_ul includes a duration Tf of 16 us immediately followed by one slot duration Tsl of 9 us. Tf includes an idle slot duration Tsl at the start thereof.

In NR-U, when the BW of a BWP assigned to the BS or UE is greater than or equal to 20 MHz, the BWP may be divided by an integer multiple of 20 MHz for fair coexistence with Wi-Fi to perform LBT in units of 20 MHz and transmit each signal. A frequency unit in which LBT is performed is referred to as a channel or an LBT sub-band. 20 MHz has a meaning as a frequency unit in which LBT is performed, and various embodiments of the present disclosure are not limited to a specific frequency value such as 20 MHz.

In some implementations, the proposed method of the present disclosure is non-limited to an LBT based U-band operation only but is similarly applicable to an L-band (or U-band) operation not accompanied by LBT. In the following description, a band may be compatible with a CC/cell. Moreover, a CC/cell (index) may be replaced by a BWP (index) configured in the CC/cell or a combination of a CC/cell (index) and a BWP (index).

Positioning

Positioning may refer to determining the geographical position and/or velocity of the UE based on measurement of radio signals. Location information may be requested by and reported to a client (e.g., an application) associated with the UE. The location information may also be requested by a client within or connected to a core network. The location information may be reported in standard formats such as cell-based or geographical coordinates, together with estimated errors of the position and velocity of the UE and/or a positioning method used for positioning.

For such positioning, a positioning reference signal (PRS) may be used. The PRS is a reference signal used to estimate the position of the UE.

For example, in the LTE system, the PRS may be transmitted only in a DL subframe configured for PRS transmission (hereinafter, "positioning subframe"). If both a multimedia broadcast single frequency network (MBSFN) subframe and a non-MBSFN subframe are configured as positioning subframes, OFDM symbols of the MBSFN subframe should have the same cyclic prefix (CP) as symbols of subframe #0. If only the MBSFN subframe is configured as the positioning subframe within a cell, OFDM symbols configured for the PRS in the MBSFN subframe may have an extended CP.

The sequence of the PRS may be defined by the following equation 1 below.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 1]}$$

$$m = 0, 1, \ldots, 2N_{RB}^{max,DL} - 1$$

In Equation 1, $n_s$ denotes a slot number in a radio frame and l denotes an OFDM symbol number in a slot. $N_{RB}^{max,DL}$ is represented as an integer multiple of $N_{SC}^{RB}$ as the largest value among DL bandwidth configurations. $N_{SC}^{RB}$ denotes the size of a resource block (RB) in the frequency domain, for example, 12 subcarriers.

c(i) denotes a pseudo-random sequence and may be initialized by the following equation 2 below.

$$c_{init} = 2^{28} \cdot \lfloor N_{ID}^{PRS}/512 \rfloor + 2^{10} \cdot (7 \cdot (n_s+1) + l + 1) \cdot (2 \cdot (N_{ID}^{PRS} \mod 512) + 1) + 2 \cdot (N_{ID}^{PRS} \mod 512) + N_{CP} \quad \text{[Equation 2]}$$

Unless additionally configured by higher layers, $N_{ID}^{PRS}$ is equal to $N_{ID}^{cell}$, and NCP is 1 for a normal CP and 0 for an extended CP.

Figure 11:
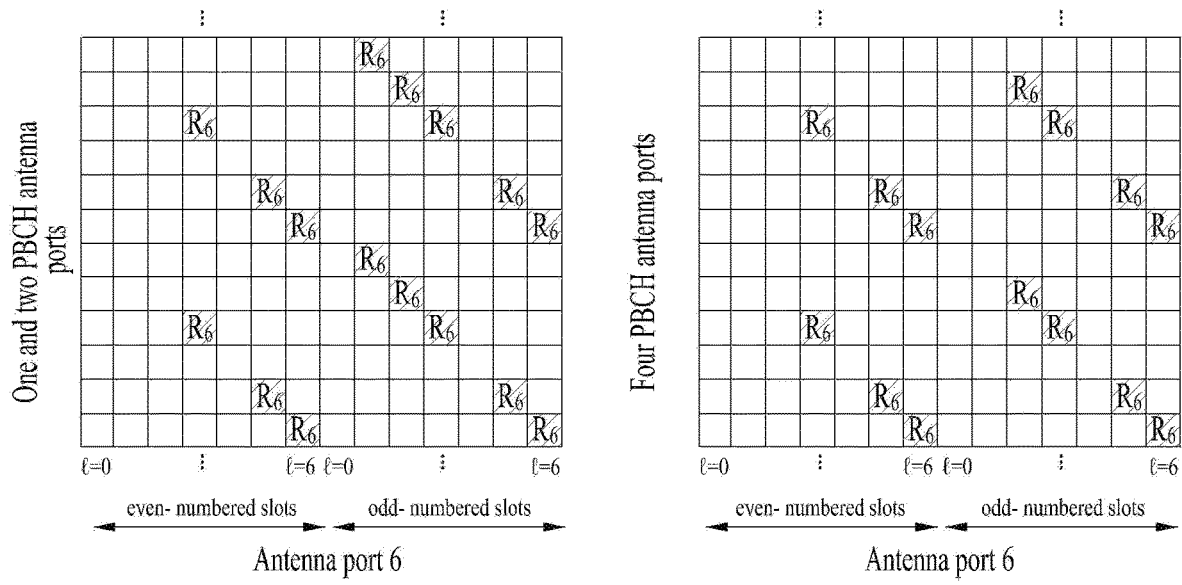
FIG. 11 is a diagram illustrating an example of a positioning reference signal (PRS) mapping.
Figure 11:
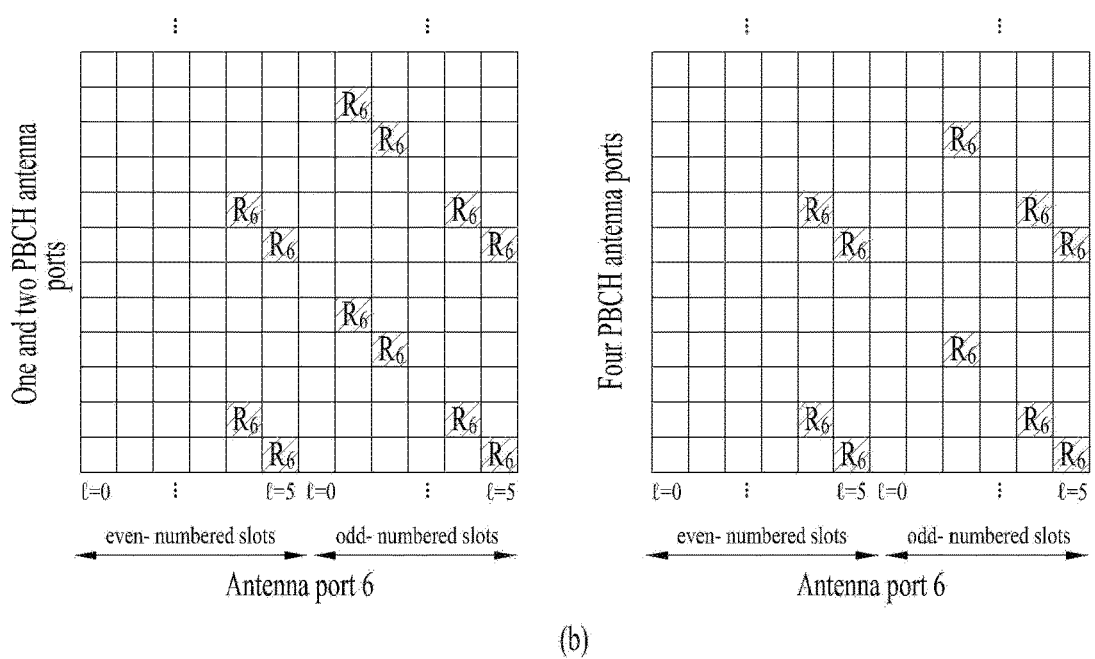

FIG. 11 is a diagram illustrating an example of PRS mapping, especially, an example of PRS mapping for use in the LTE system.

As illustrated in FIG. 11, the PRS may be transmitted through an antenna port 6. FIG. 11(a) illustrates mapping of the PRS in the normal CP and FIG. 11(b) illustrates mapping of the PRS in the extended CP.

On the other hand, in the LTE system, the PRS may be transmitted in consecutive subframes grouped for positioning. The subframes grouped for positioning are referred to as a positioning occasion. The positioning occasion may consist of 1, 2, 4 or 6 subframes. The positioning occasion may occur periodically at a periodicity of 160, 320, 640 or 1280 subframes. A cell-specific subframe offset value may be defined to indicate the starting subframe of PRS transmission. The offset value and the periodicity of the positioning occasion for PRS transmission may be derived from PRS configuration indexes as listed in the following table 9 below.

TABLE 9

| PRS configuration Index ($I_{PRS}$) | PRS periodicity (subframes) | PRS subframe offset (subframes) |
|---|---|---|
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-2404 | 5 | $I_{PRS}$-2400 |
| 2405-2414 | 10 | $I_{PRS}$-2405 |
| 2415-2434 | 20 | $I_{PRS}$-2410 |
| 2435-2474 | 40 | $I_{PRS}$-2435 |
| 2475-2554 | 80 | $I_{PRS}$-2475 |
| 2555-4095 | | Reserved |

A PRS included in each positioning occasion is transmitted with constant power. A PRS in a certain positioning occasion may be transmitted with zero power, which is referred to as PRS muting. For example, when a PRS transmitted by a serving cell is muted, the UE may easily detect a PRS of a neighbor cell.

The PRS muting configuration of a cell may be defined by a periodic muting sequence consisting of 2, 4, 8 or 16 positioning occasions. That is, the periodic muting sequence may include 2, 4, 8, or 16 bits according to a positioning occasion corresponding to the PRS muting configuration and each bit may have a value "0" or "1". For example, PRS muting may be performed in a positioning occasion with a bit value of "0".

The positioning subframe is designed to have a low-interference subframe so that no data is transmitted in the positioning subframe. Therefore, the PRS is not subjected to interference due to data transmission although the PRS may interfere with PRSs of other cells.

Positioning methods supported in the NG-RAN may include a GNSS, an OTDOA, an E-CID, barometric sensor positioning, WLAN positioning, Bluetooth positioning, a TBS, uplink time difference of arrival (UTDOA) etc. Although any one of the positioning methods may be used for UE positioning, two or more positioning methods may be used for UE positioning.

(1) Observed Time Difference of Arrival (OTDOA)

Figure 12:
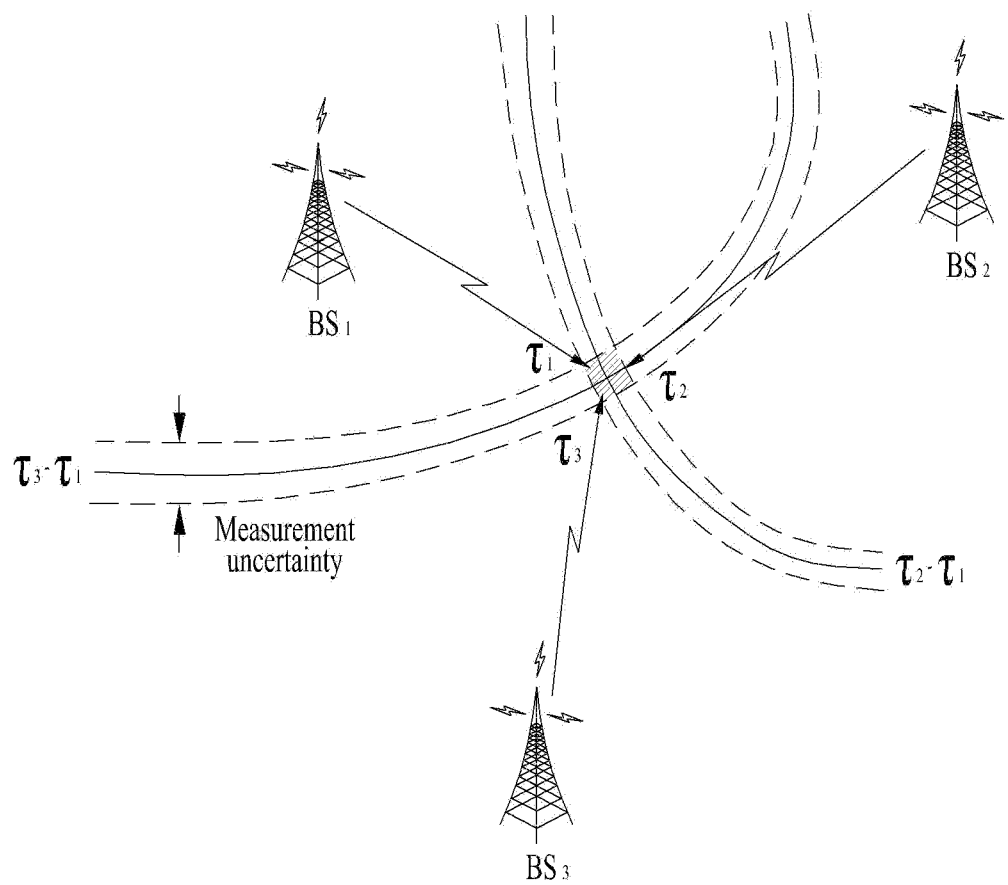
FIG. 12 is a diagram illustrating an example of an observed time difference of arrival (OTDOA) positioning method according to an embodiment of the present disclosure.

FIG. 12 is a diagram illustrating an example of an observed time difference of arrival (OTDOA) positioning method according to an embodiment of the present disclosure.

The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the start time of the subframe received from the measurement cell. The reference cell may be selected by the UE.

For accurate OTDOA measurement, it is necessary to measure times of arrival (ToAs) of signals received from three or more geographically distributed TPs or BSs. For example, ToAs for TP 1, TP 2, and TP 3 may be measured, and an RSTD for TP 1 and TP 2, an RSTD for TP 2 and TP 3, and an RSTD for TP 3 and TP 1 are calculated based on the three ToAs. A geometric hyperbola may be determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, an RSTD for two TPs may be calculated based on [Equation 3] below.

$$RSTDi_{,1} = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1)$$
[Equation 3]

In Equation 3, c is the speed of light, {xt, yt} are (unknown) coordinates of a target UE, {xi, yi} are (known) coordinates of a TP, and {x1, y1} are coordinates of a reference TP (or another TP). Here, (Ti−T1) is a transmission time offset between two TPs, referred to as "real time differences" (RTDs), and ni and n1 are UE ToA measurement error values.

(2) Enhanced Cell ID (E-CID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the OD positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (RX)-transmission (TX) time difference, GERAN/WLAN reference signal strength indication (RSSI), UTRAN common pilot channel (CPICH) received signal code power (RSCP), and/or UTRAN CPICH Ec/Io E-UTRAN measurement: ng-eNB RX-TX time difference, timing advance (TADv), and/or angle of arrival (AoA)

Here, $T_{ADV}$ may be divided into Type 1 and Type 2 as follows.

$T_{ADV}$ Type 1=(ng-eNB RX-TX time difference)+(UE E-UTRA RX-TX time difference)

$T_{ADV}$ Type 2=ng-eNB RX-TX time difference

AoA may be used to measure the direction of the UE. AoA is defined as the estimated angle of the UE counterclockwise from the eNB/TP. In this case, a geographical reference direction may be north. The eNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotation.

(3) Uplink Time Difference of Arrival (UTDOA)

UTDOA is used to determine the position of the UE by estimating the arrival time of an SRS. When an estimated SRS arrival time is calculated, a serving cell is used as a reference cell and the position of the UE may be estimated by the arrival time difference with another cell (or an eNB/TP). To implement UTDOA, an E-SMLC may indicate the serving cell of a target UE in order to indicate SRS transmission to the target UE. The E-SMLC may provide configurations such as periodic/non-periodic SRS, bandwidth, and frequency/group/sequence hopping.

(4) Multi RTT (Multi-Cell RTT)

Unlike OTDOA that requests fine synchronization (e.g., nano-second level) between TPs within the network, RTT is configured based on TOA measurement in the same manner as in OTDOA, but RTT requires only coarse TRP (e.g., BS) timing synchronization.

Various Embodiments of the Present Disclosure

Hereinafter, various embodiments of the present disclosure will be described in detail based on the technical idea described above.

The terms used in the description of various embodiments of the present disclosure may be as follows.

AOA (AoA): angle of arrival
PRS: positioning reference signal
RTT: round trip time
RSRP: reference signal reception power
RSTD: reference signal time difference/relative signal time difference
SRS: sounding reference signal
TRP: transmission reception point (TP: transmission point)
Slot: Slot may refer to a basic time unit (TU) (or a time interval) for data scheduling. The slot may include a plurality of symbols. Here, the symbol may include OFDM-based symbols (e.g., CP-OFDM symbol, DFTs-OFDM symbol, etc.). In the present specification, symbols, OFDM-based symbols, OFDM symbols, CP-OFDM symbols, and DFT-S-OFDM symbols can be replaced with each other.

Channel: Channel may refer to a carrier composed of consecutive sets (consecutive aggregates) of RBs that enable a channel access procedure to be performed in a shared spectrum, or may refer to a part of the carrier. For example, the channel may refer to a frequency unit in which LBT is performed. In the following description, the term "channel" may be used interchangeably with "LBT subband".

LBT is performed for Channel X/about Channel X: This means that LBT is performed to confirm whether Channel X can be transmitted or not. For example, the CAP procedure may be performed prior to beginning of Channel-X transmission.

LBT is performed in Symbol X/about Symbol X/for Symbol X: This means that LBT is performed to confirm whether data transmission can begin from Symbol X. For example, the CAP procedure may be performed in previous symbol(s) of the symbol X.

Preferably, interference between the positioning signal such as PRS and/or SRS and other signals/channels may be minimized in consideration of the accuracy of signal reception. On the other hand, if only the signals for positioning are transmitted and received, a wireless channel may not be used for data communication, so that the wireless channel may be considered inefficient. Therefore, in order to minimize such inefficiency during transmission of positioning signals, PRSs transmitted from the BS (or TRP, in the present specification, the BS may be used interchangeably with the TRP) may cooperate with each other to implement simultaneous transmission of the PRSs. Preferably, SRSs transmitted from UEs may cooperate with each other to implement simultaneous transmission of the SRSs. In addition, according to the RTT-based positioning technique, after an initiator is first transmitted, responders are configured to receive the initiator, so that the responders may cooperatively retransmit signals related to the initiator.

However, in order to transmit signals in the unlicensed band, signal transmission is allowed only in a situation where the channel is not occupied by other nodes. As a result, although signals are configured to be cooperatively transmitted, it may be difficult for the signals to be transmitted in a cooperative manner according to channel states of the respective nodes. Accordingly, the present disclosure provides various Tx/Rx methods capable of maximally supporting cooperative signal transmission in the unlicensed band.

Although the present disclosure provides a method for transmitting/receiving signals/channels for positioning, the same method can also be extended and applied to either cooperative transmission between TRPs or D2D (Device-to-Device) cooperative transmission.

Figure 13:
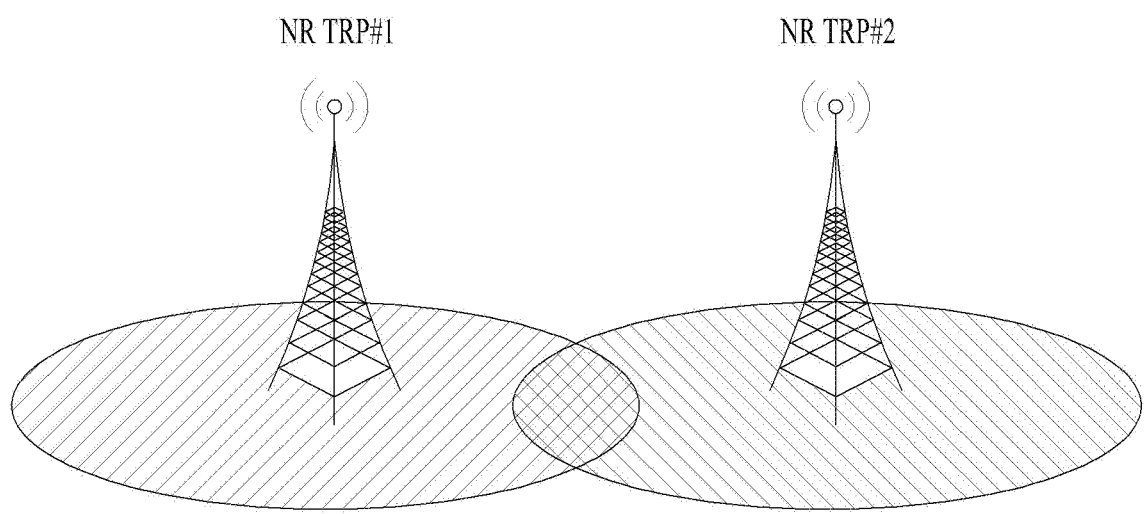
FIG. 13 is a diagram illustrating an example of a system applicable to the embodiments of the present disclosure.
Figure 14:
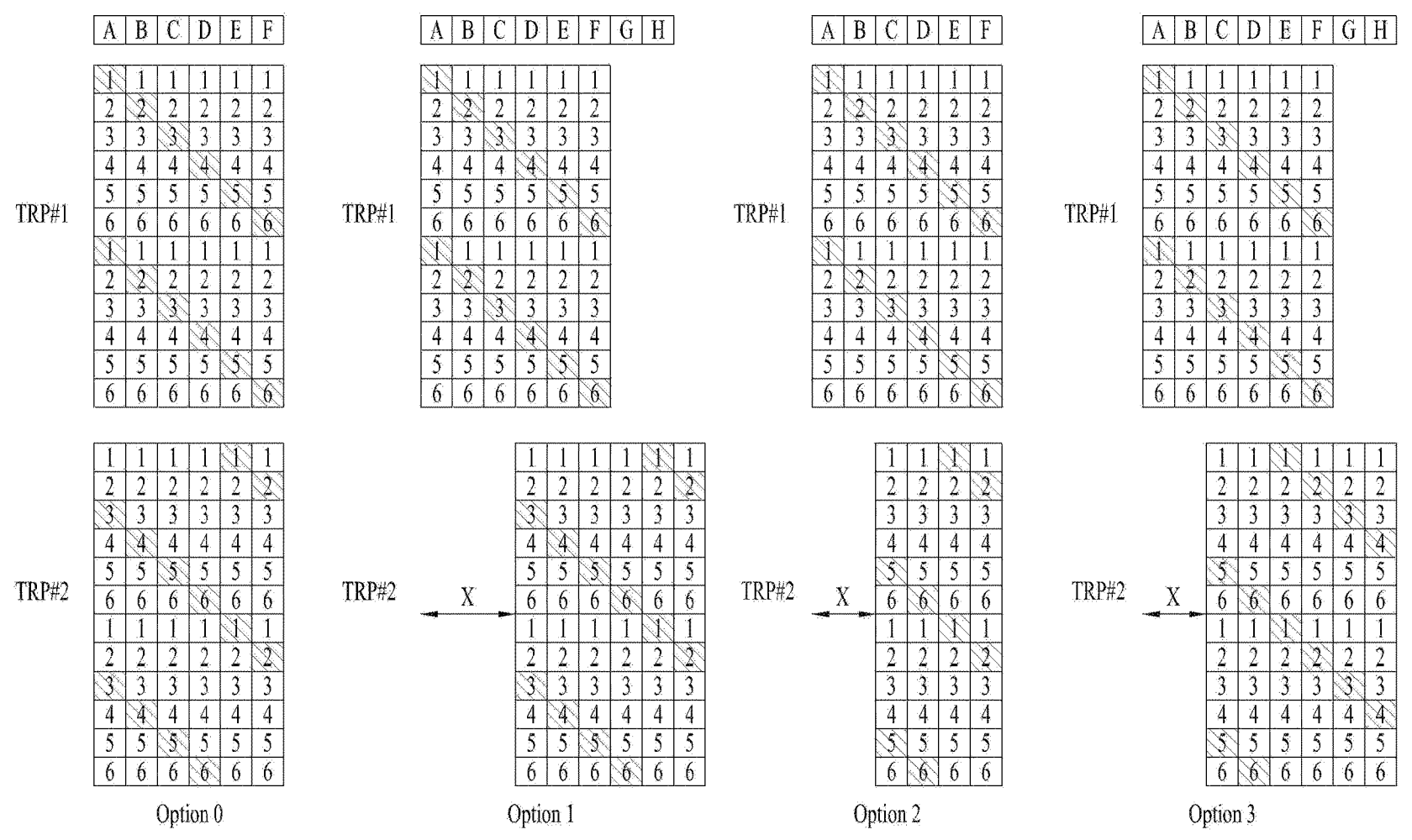

FIG. 13 is a diagram illustrating an example of a system applicable to the embodiments of the present disclosure. FIG. 14 is a diagram illustrating examples related to a PRS transmission configuration applicable to the embodiments of the present disclosure. Specifically, FIGS. 13 and 14 illustrate an example of a configured situation in which PRS transmission is configured for a total of 6 symbols (#A~#F) included in specific slot(s) of a specific frame for two adjacent BSs (TRPs). It is obvious to those skilled in the art that the same method as described above can be extended and applied to transmission of multiple TRPs other than adjacent TRPs during the same symbol period, can be extended to the case where a smaller or larger number of symbols than the number of symbols assumed in the present disclosure is configured, and can also be extended to transmission of signals/channels for positioning (not for PRS).

As shown in FIG. 14, it is assumed that PRS transmitted from each TRP is a comb-type RS and different comb indexes are applied to the symbols. However, different frequency (and/or code) domain resources may be used according to TRPs, and the same method as described above can also be applied to a general RS designed to apply different (or the same) frequency (and/or code) domain resources to the respective symbols. Especially, PRS may also be configured using (nearly) all REs included in a single symbol.

[Method #1] As shown in 'Option 0' in FIG. 14, if both TRP #1 and TRP #2 are successful in the CAP prior to transmission of Symbol #A, each of TRP #1 and TRP #2 can transmit the PRS during the configured 6 symbols. In Method #1, when TRP #2 is not successful in the CAP prior to transmission of Symbol #A and the PRS is transmitted after lapse of an X period from the Symbol #A, a method for transmitting the PRS of TRP #2 is proposed.

[Method #1-1] TRP #2 can transmit a signal shifted by the X period as shown in Option 1 of FIG. 14. For example, if the X period includes two symbol sections, 2-symbol shifting is applied to resource/sequence (seq.) to be transmitted to the symbols #A~#F, so that the shifted result can be transmitted to symbols #C~#H. Method #1-1 has advantages in that the previously generated signals are simply shifted and transmitted from the viewpoint of transmission (Tx) nodes. However, before shifting is performed as shown in 'Option 0' of FIG. 14, TRP #1 and TRP #2 having used orthogonal frequency resources can utilize the same frequency resources after execution of the shifting operation, resulting in reduction in interference.

[Method #1-2] TRP #2 may puncture signals corresponding to the X period, and may transmit the signals during the remaining configured period, as shown in Option 2 of FIG. 14. For example, if the X period is a 2-symbol period, resources/sequences to be transmitted to Symbol #A and Symbol #B may be punctured, and originally transmitted signals can be transmitted during the remaining symbols #C~F. After lapse of 6 symbols configured to previously transmit the PRS, signal transmission for other uses (e.g., DL/UL data) can be performed instead of transmission of the positioning signal. On the other hand, if simple puncturing is performed, the number of PRS reception (Rx) symbols is reduced, reception (Rx) energy is also reduced, so that positioning performance may be problematic. Accordingly, after a maximum value of the X period is configured, a rule may be configured to abandon PRS transmission when the X period exceeds the maximum value. For example, in a situation where the maximum value of the X period is a 4-symbol period, if signal transmission is not successful in the CAP before reaching Symbol #E from among 6 symbols #A~F configured for PRS transmission, the PRS may not be transmitted for the remaining configured period.

[Method #1-3] As shown in Option 3 of FIG. 14, TRP #2 may puncture signals corresponding to the X period, may transmit the signals during the remaining configured period, may attach the signals corresponding to the punctured X period to the end of the transmitted signals (in a wraparound format), and may transmit the resultant signals. For example, if the X period is a 2-symbol period, resources/sequences to be transmitted to Symbol #A and Symbol #B may be punctured, and originally generated signals can be transmitted during the period of the remaining symbols

C~F. The PRS may be transmitted to Symbol #G and Symbol #H through resources/sequences that are scheduled to be transmitted at Symbol #A and Symbol #B. As a result, TRP-to-TRP interference encountered in Method #1-1 can be solved. In addition, if PRS energy corresponding to a 6-symbol period is required, the problem in which positioning performance is not satisfied with only the puncturing shown in Method #1-2 can be solved.

Similar to Method #1-2, the maximum value of the X period should be configured even in Method #1-1 and Method #1-3. Alternatively, a window required for PRS transmission may be set to a Y-symbol period, and the number of PRS transmission symbols from among the Y-symbol period may be separately set to 6 symbols. This means that transmission of signals of other uses (e.g., DL/UL data) other than the PRS is not allowed for a (maximum) (6+X) symbol period or for the Y-symbol period. If the length from a time point corresponding to the successful CAP to the last symbol index where PRS transmission is allowed is shorter than the length of 6 symbols, the PRS transmission may be discarded, or as many symbols as the insufficient number of symbols may be punctured and PRS transmission is then performed.

After receiving the PRS transmitted from TRP #2 serving as a different TRP as shown in Method #1, when cooperative transmission is performed by TRP #1, signal transmission may also be performed in response to a boundary between the PRS symbols received from TRP #2 (not a boundary between the symbols/frames transmitted from TRP #1).

[Method #2] There is proposed a CAP method of a TRP that has failed in the CAP immediately before the beginning of Symbol #A where the start of PRS transmission is configured. Specifically, as shown in Options 1-3 of FIG. 14, TRP #1 succeeds in the CAP prior to the beginning of Symbol #A, so that the TRP #1 may transmit the PRS configured in Symbols #A~F. Then, in a situation where TRP has failed in the CAP prior to transmission of Symbol #A, a CAP method of TRP #2 is proposed as shown in Method #2.

[Method #2-1] TRP #2 attempts to detect the PRS during the period of Symbol #A. After PRS detection is successful, PRS transmission from Symbol #B may be started without using the additional CAP. In this case, the PRS attempting to perform signal detection may be some PRSs belonging to a set of specific PRSs. The PRSs belonging to the corresponding set may be configured for each PRS symbol (or for each symbol group). For example, when TRP #2 transmits the PRSs (i.e., PRSs transmitted by TRP #1) belonging to the set of the same PRSs, TRP #2 may start PRS transmission from Symbol #B.

On the other hand, since there is a high possibility that TRP #2 fails to detect the PRS during a time period corresponding to Symbol #A, it may be necessary to simultaneously perform the legacy CAP (e.g., the CAP method to be performed based on information about whether an energy value detected for a specific time period is higher than or less than a specific threshold value) as well as the abovementioned CAP. In a situation where random backoff-based CAP is performed, when a backoff counter value corresponding to the symbol period is set to K and the PRS is then detected for the corresponding symbol period, the backoff counter value corresponding to the K value may be reduced. Subsequently, when the reduced resultant value is equal to or less than zero '0', PRS transmission may be allowed. Conversely, when the reduced resultant value is higher than zero '0', the same process may be repeatedly performed in the next symbol while being kept in the reduced resultant value. At this time, the K value may be determined by the ratio between the symbol period (=T1, for example, about 70 µs at 15 kHz SCS, or about 35 vs at 30 kHz SCS) and the CAP slot time (=T2, for example, 9 µs). For example, the K value may be determined by floor{T1/T2} (where, the 'floor' operation may refer to a smaller maximum integer value, and may be replaced with the 'ceiling or round' operation).

[Method #2-2] When channel access is performed only using PRS detection as shown in Method #2-1, interference may occur in data communication between other nodes, each of which does not transmit the PRS. Thus, whereas PRS detection is attempted during the time period of Symbol #A as described in Method #2-1, if an Rx energy value other than the received PRS is equal to or less than a specific threshold, PRS transmission can be allowed. In a situation where the random backoff-based CAP is performed, if a backoff counter value corresponding to the symbol period is set to K, if the PRS is then detected for the corresponding symbol period, and if an Rx energy value other than the PRS is equal to or less than a specific threshold, the backoff counter value corresponding to the K value may be reduced. Thereafter, when the reduced resultant value is equal to or less than zero '0', PRS transmission can be allowed. Conversely, when the reduced resultant value is higher than zero '0', the same process may be repeatedly performed in the next symbol while being kept in the reduced resultant value. At this time, the K value may be determined by the ratio between the symbol period (=T1, for example, about 70 is at 15 kHz SCS, or about 35 is at 30 kHz SCS) and the CAP slot time (=T2, for example, 9 µs). For example, the K value may be determined by floor{T1/T2} (where, the 'floor' operation may refer to a smaller maximum integer value, and may be replaced with the 'ceiling or round' operation).

As described in Method #2-1 and Method #2-2, the time period of one symbol may be considered insufficient in determining whether to transmit the PRS of the next symbol based on a method of detecting PRSs to be transmitted for one symbol. For example, if one symbol is additionally required for the processing time margin (and/or the RX/TX switching time margin) in determining whether the PRS is detected or not during the period of Symbol #A, although PRS detection is successfully performed during the period of Symbol #A, the actual PRS transmission time point may be set to Symbol #C.

[Method #3] Assuming that the actual PRS transmission (start) time point is changed by the CAP as shown in Options 1-3 of FIG. 14, the UE scheduled to receive the corresponding PRS should recognize the actual PRS transmission (start) time point so as to perform the stable positioning related estimation (e.g., RSTD). Accordingly, a method for enabling the BS to indicate the actual PRS transmission (start) time point will hereinafter be described with reference to the attached drawings.

[Method #3-1] Information about the start time can be known by utilizing separate resources according to the PRS transmission (start) time point. For example, in a situation where the same TRP is used, when the PRS transmission start time point is set to Symbol #C not Symbol #A, separate comb indexes, a separate sequence initialization seed value (e.g., in case of a gold sequence), and a separate cyclic shift (CS) value (e.g., in case of a Zadoff-Chu (ZC) sequence) may be utilized by a predetermined rule, so that it can be recognized that Symbol #C is a start time point. However, in this case, the UE should detect separate resources/sequences at each available PRS transmission start time point, resulting in an increase in UE implementation complexity.

[Method #3-2] In order to solve the problem of Method #3-1, a method for shifting the sequence mapping on a frequency axis can be used while resources/sequences scheduled to be transmitted according to a PRS transmission (start) time point for each TRP remain unchanged. Specifically, the number of shifting actions on the frequency axis may refer to a function of how late the PRS transmission (start) time point was started. For example, in a situation where a sequence located on a total of N tones (or N subcarriers, the term 'tone' and the term 'subcarrier' may be used interchangeably in the following description) on the frequency axis is transmitted for each symbol, assuming that the mapping process at Symbol #C is denoted by t(0), t(1), . . . , t(N-1), t(0) may be mapped to a first comb index '5' in TRP #2 shown in 'Option 0' of FIG. 14, and t(1) may be mapped to a second comb index '5'. When data transmission is performed after lapse of 2 symbols as shown in Option 3 of FIG. 14, t(2) is mapped to a first comb index '5' and t(3) is mapped to a second comb index '5' during the mapping process at Symbol #C. In detail, in a situation where the sequence initially mapped to the comb index '5' of Symbol #C is set to t(0) or t(1), if data transmission is started after lapse of K symbols from the originally intended start time point, sequences t(k) and t(k+1) shifted on the frequency axis can be mapped. In Option 3 of FIG. 14, the PRS transmission start time point may be shifted by 2 symbols, so that t(2) or t(3) may be mapped to the comb index '5' of Symbol #C. Tone shifting on the corresponding frequency axis may be applied only to a specific symbol (e.g., a first transmission symbol), and/or may be applied to all symbols of the transmission PRS. In a situation where the UE receives the PRS transmitted from TRP #2 at Symbol #C, if t(0) is mapped to the first comb index '5' and t(1) is mapped to the second comb index '5', this means that transmission of the corresponding PRS is started from Symbol #A. If t(2) is mapped to the first comb index '5' and t(3) is mapped to the second comb index '5', this means that transmission of the corresponding PRS is started from Symbol #C.

[Method #3-3] PRS transmission (start) time point (or frequency-axis density information of the transmission PRS) for each TRP may be signaled through a separate signal/channel. For example, the PRS transmission (start) time point (or frequency-axis density information of the transmission PRS) may be signaled through a preamble or post-amble for each PRS transmission. Alternatively, the PRS transmission start information for each TRP may be collected through a specific DL channel (e.g., PDCCH or group-common PDCCH) of the serving cell, so that the collected information may be signaled to UE(s).

In the above-described proposed methods, the PRS transmission period may be configured in advance, and may be opportunistically determined according to success or failure of the CAP. When the PRS transmission period is opportunistically determined as described above, beginning of PRS transmission may be signaled through a specific signal/channel (e.g., PDCCH or group-common PDCCH). In addition, a period where opportunistic PRS transmission is allowed for each TRP or for each TRP group may be configured in advance, and PRS may be aperiodically transmitted within the configured period.

Figure 15:
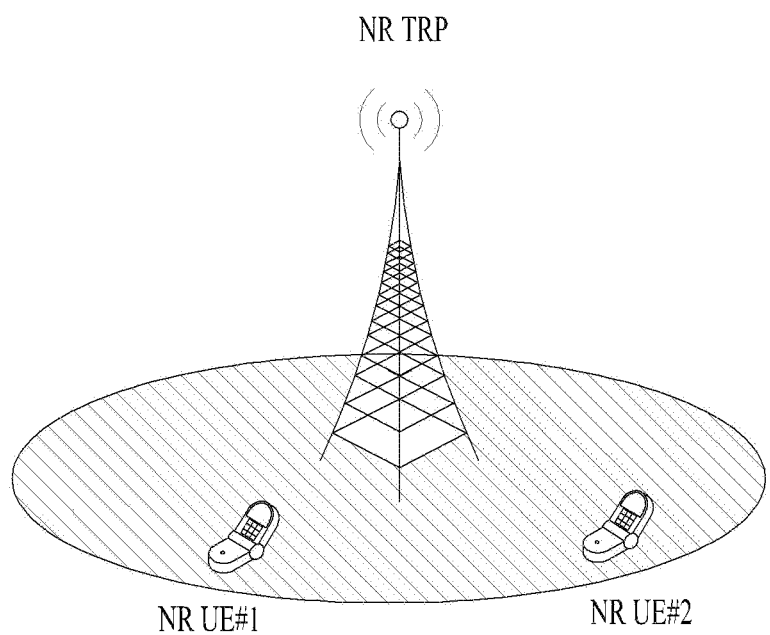
FIG. 15 is a diagram illustrating another example of a system applicable to the embodiments of the present disclosure.
Figure 16:
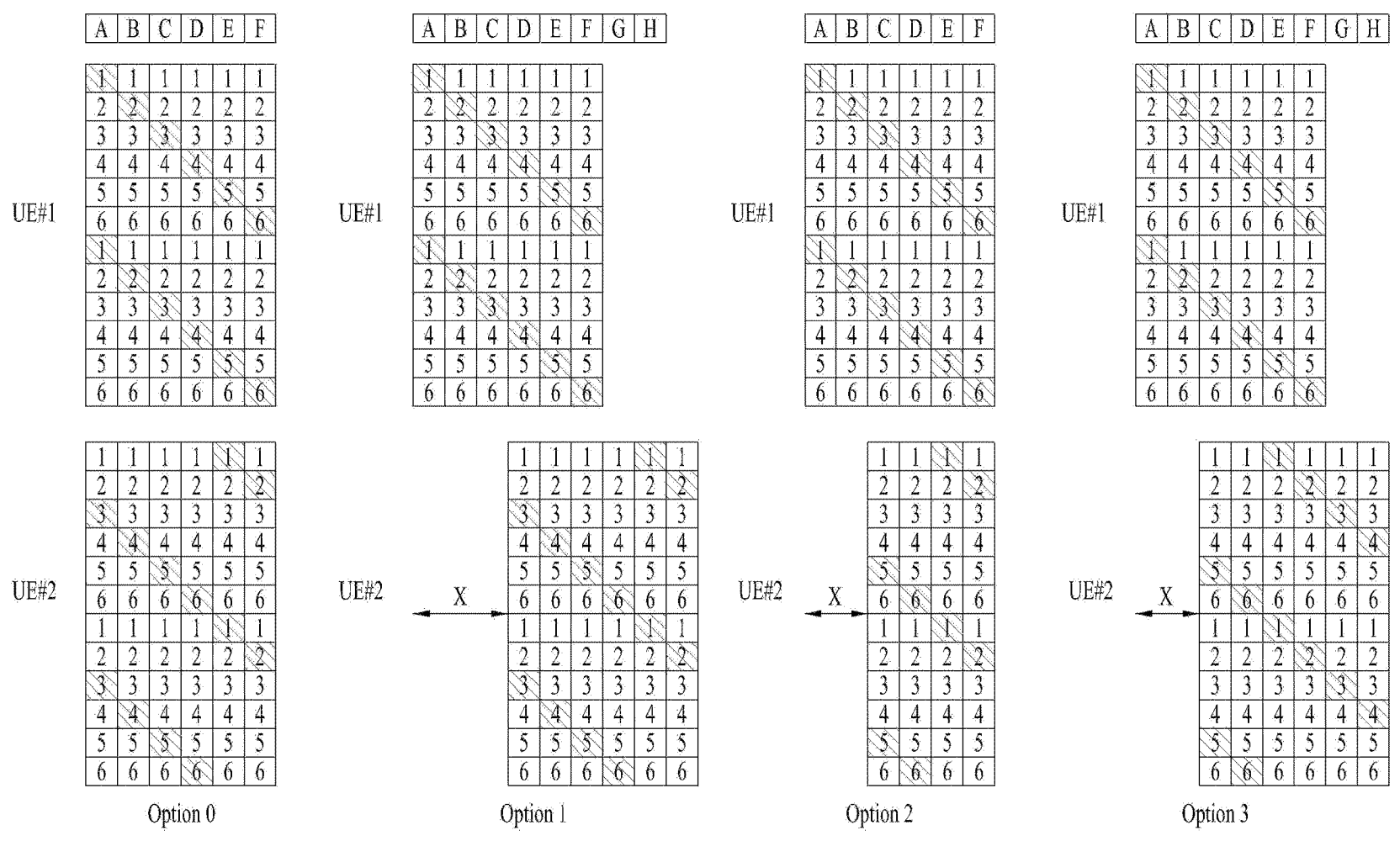

FIG. 15 is a diagram illustrating another example of a system applicable to the embodiments of the present disclosure. FIG. 16 is a diagram illustrating an example related to an SRS transmission configuration applicable to the embodiments of the present disclosure. Specifically, FIGS. 15 and 16 illustrate examples of the situation where SRS transmission is configured during a total of 6 symbols #A~#F within specific slot(s) of a specific frame so that two different UEs associated with the same TRP (or different TRPs) can perform cooperative SRS transmission.

It is obvious to those skilled in the art that the same method can be extended not only to data transmission of the corresponding two UEs, but also to data transmission of the plurality of UEs during the same symbol period. It is also obvious to those skilled in the art that the same method can be extended to the case where the period having a smaller or larger number of symbols than the predetermined number of symbols assumed in the present disclosure is configured, and can also be extended to transmission of signals/channels for positioning (not SRS). Especially, (almost) all REs included in a single symbol are utilized to construct the SRS.

As shown in FIG. 16, the present disclosure assumes that the SRS transmitted from each UE is a comb-type RS and different comb indexes are applied to the respective symbols. However, the same method can also be applied to a general RS case in which different frequency (and/or code) domain resources are utilized for the respective UEs and different (or the same) frequency (and/or code) domain resources are utilized for the respective symbols.

[Method #1A] As shown in 'Option 0' of FIG. 16, if both UE #1 and UE #2 are successful in the CAP prior to reaching Symbol #A, each of UE #1 and UE #2 can transmit the SRS during the period of configured 6 symbols. In a situation where UE #2 has failed in the CAP prior to reaching Symbol #A so that the UE #2 transmits the SRS after lapse of the X period from the Symbol #A, Method #1A proposes a method for enabling the UE #2 to perform SRS transmission.

[Method #1A-1] As shown in 'Option 1' of FIG. 16, UE #2 can transmit the signal shifted by the X period. For example, if the X period is a two-symbol period, 2-symbol shifting may be performed on resources/sequences scheduled to be transmitted to Symbols #A~F, so that the resultant resources/sequences can be transmitted to Symbols #C~H. Method #1A-1 has advantages in that the previously generated signals are simply shifted and transmitted from the viewpoint of the transmission (Tx) node. However, Method #1A-1 has disadvantages in that, as shown in 'Option 0' of FIG. 16, UE #1 and UE #2 configured to use orthogonal frequency resources prior to execution of shifting can use the same frequency resources after execution of such shifting, so that interference may occur between UE #1 and UE #2.

[Method #1A-2] UE #2 may puncture signals corresponding to the X period, and may transmit the signals during the remaining configured period, as shown in 'Option 2' of FIG. 16. For example, if the X period is a two-symbol period, resources/sequences to be transmitted to Symbols #A and #B may be punctured, and originally generated signals can be transmitted during the period of the remaining symbols #C~F. After lapse of 6 symbols configured to previously transmit the SRS, signal transmission of other uses (e.g., DL/UL data) can be performed instead of transmission of the positioning signal. On the other hand, if simple puncturing is performed, the number of SRS reception (Rx) symbols is reduced, and reception (Rx) energy is also reduced, so that positioning performance may be problematic. Thus, a predetermined rule can be configured in a manner that a maximum value of the X period is configured to abandon SRS transmission when the X period exceeds the maximum value. For example, in a situation where the maximum value of the X period is a 4-symbol period, if signal transmission is not successful in the CAP before reaching Symbol #E from among 6 symbols #A~F configured for SRS transmission, the SRS may not be transmitted for the remaining configured period.

[Method #1A-3] As shown in Option 3 of FIG. 16, UE #2 may puncture signals corresponding to the X period, may transmit the signals during the remaining configured period, may attach the signals corresponding to the punctured X period to the end of the transmitted signals (in a wraparound format), and may transmit the resultant signals. For example, if the X period is a 2-symbol period, resources/sequences to be transmitted to Symbol #A and Symbol #B may be punctured, and originally generated signals can be transmitted during the remaining symbols #C~F. The SRS may be transmitted to Symbol #G and Symbol #H through resources/sequences that are scheduled to be transmitted at Symbol #A and Symbol #B. As a result, TRP-to-TRP interference encountered in Method #1A-1 can be solved. In addition, if SRS energy corresponding to a 6-symbol period is required, the problem in which positioning performance is not satisfied with only the puncturing shown in Method #1A-2 can be solved.

Similar to Method #1A-2, the maximum value of the X period should be configured even in Method #1A-1 and Method #1A-3. Alternatively, a window required for SRS transmission may be set to a Y-symbol period, and the number of SRS transmission symbols from among the Y-symbol period may be separately set to 6 symbols. This means that transmission of signals of other uses (e.g., DL/UL data) other than the SRS is not allowed for a (maximum) (6+X) symbol period or for the Y-symbol period. If the length from a time point corresponding to the successful CAP to the last symbol index where PRS transmission is allowed is shorter than the length of 6 symbols, the SRS transmission may be discarded, or as many symbols as the insufficient number of last symbols may be punctured and SRS transmission is then performed.

After receiving the SRS transmitted from UE #2 serving as a different UE as shown in Method #1A, when cooperative transmission is performed by UE #1, signal transmission may also be performed in response to a boundary between the SRS symbols received from UE #2 (not a boundary between the symbols/frames maintained by the serving cell of UE #1).

[Method #2A] There is proposed a CAP method of the UE that has failed in the CAP immediately before the beginning of Symbol #A where the start of SRS transmission is configured. Specifically, as shown in Options 1-3 of FIG. 16, UE #1 succeeds in the CAP prior to the beginning of Symbol #A, so that the UE #1 may transmit the SRS configured in Symbols #A~F. Then, in a situation where a UE has failed in the CAP prior to transmission of Symbol #A, a CAP method of UE #2 is proposed as shown in Method #2A.

[Method #2A-1] UE #2 attempts to detect the SRS during the period of Symbol #A. After SRS detection is successful, SRS transmission from Symbol #B may be started without using the additional CAP. In this case, the SRS attempting to perform signal detection may be some SRSs belonging to a set of specific SRSs. The SRSs belonging to the corresponding set may be configured for each SRS symbol (or for each symbol group). For example, when UE #2 transmits the SRSs (i.e., SRSs transmitted by UE #1) belonging to the set of the same SRSs, UE #2 may start SRS transmission from Symbol #B.

On the other hand, since there is a high possibility that UE #2 fails to detect the SRS during a time period corresponding to Symbol #A, it may be necessary to simultaneously perform the legacy CAP (e.g., the CAP method to be performed based on information about whether an energy value detected for a specific time period is higher than or less than a specific threshold value) as well as the above-mentioned CAP. In a situation where random backoff-based CAP is performed, when a backoff counter value corresponding to the symbol period is set to K and the SRS is then detected for the corresponding symbol period, the backoff counter value corresponding to the K value may be reduced. Subsequently, when the reduced resultant value is equal to or less than zero '0', SRS transmission may be allowed. Conversely, when the reduced resultant value is higher than zero '0', the same process may be repeatedly performed in the next symbol while being kept in the reduced resultant value. At this time, the K value may be determined by the ratio between the symbol period (=T1, for example, about 70 ms at 15 kHz SCS, or about 35 µs at 30 kHz SCS) and the CAP slot time (=T2, for example, 9 µs). For example, the K value may be determined by floor{T1/T2} (where, the 'floor' operation may refer to a smaller maximum integer value, and may be replaced with the 'ceiling or round' operation).

[Method #2A-2] When channel access is performed only using SRS detection as shown in Method #2A-1, interference may occur in data communication between other nodes, each of which does not transmit the SRS. Thus, whereas SRS detection is attempted during the time period of Symbol #A as described in Method #2A-1, if an Rx energy value other than the received SRS is equal to or less than a specific threshold, SRS transmission can be allowed. In a situation where the random backoff-based CAP is performed, if a backoff counter value corresponding to the symbol period is set to K, if the SRS is then detected for the corresponding symbol period, and if an Rx energy value other than the SRS is equal to or less than a specific threshold, the backoff counter value corresponding to the K value may be reduced. Thereafter, when the reduced resultant value is equal to or less than zero '0', SRS transmission can be allowed. Conversely, when the reduced resultant value is higher than zero '0', the same process may be repeatedly performed in the next symbol while being kept in the reduced resultant value. At this time, the K value may be determined by the ratio between the symbol period (=T1, for example, about 70 µs at 15 kHz SCS, or about 35 µs at 30 kHz SCS) and the CAP slot time (=T2, for example, 9 µs). For example, the K value may be determined by floor{T1/T2} (where, the 'floor' operation may refer to a smaller maximum integer value, and may be replaced with the 'ceiling or round' operation).

As described in Method #2A-1 and Method #2A-2, the time period of one symbol may be considered insufficient in determining whether to transmit the SRS of the next symbol based on a method of detecting SRSs to be transmitted for one symbol. For example, if one symbol is additionally required for the processing time margin (and/or the RX/TX switching time margin) in determining whether the SRS is detected or not during the period of Symbol #A, although SRS detection is successfully performed during the period of Symbol #A, the actual PRS transmission time point may be set to Symbol #C.

[Method #3A] Assuming that the actual SRS transmission (start) time point is changed by the CAP as shown in Options 1-3 of FIG. 16, the BS (or TRP) scheduled to receive the corresponding SRS should recognize the actual SRS transmission (start) time point so as to perform the stable positioning related estimation (e.g., ToA). Accordingly, a method for enabling the UE to indicate the actual SRS transmission (start) time point will hereinafter be described with reference to the attached drawings.

[Method #3A-1] Information about the start time can be known by utilizing separate resources according to the SRS transmission (start) time point. For example, in a situation where the same UE is used, when the SRS transmission start time point is set to Symbol #C not Symbol #A, separate comb indexes, a separate sequence initialization seed value (e.g., in case of a gold sequence), and a separate cyclic shift (CS) value (e.g., in case of a Zadoff-Chu (ZC) sequence) may be utilized by a predetermined rule, so that it can be recognized that Symbol #C is a start time point. However, in this case, the BS should detect separate resources/sequences at each available SRS transmission start time point, resulting in an increase in BS implementation complexity.

[Method #3A-2] In order to solve the problem of Method #3A-1, a method for shifting the sequence mapping on a frequency axis can be used while resources/sequences scheduled to be transmitted according to a SRS transmission (start) time point for each UE remain unchanged. Specifically, the number of shifting actions on the frequency axis may refer to a function of how late the SRS transmission (start) time point was started. For example, in a situation where a sequence located on a total of N tones on the frequency axis is transmitted for each symbol, assuming that the mapping process at Symbol #C is denoted by t(0), t(1), . . . , t(N−1), t(0) may be mapped to a first comb index '5' in UE #2 shown in 'Option 0' of FIG. 16, and t(1) may be mapped to a second comb index '5'. When data transmission is performed after lapse of 2 symbols as shown in Option 3 of FIG. 16, t(2) is mapped to a first comb index '5' and t(3) is mapped to a second comb index '5' during the mapping process at Symbol #C. In detail, in a situation where the sequence initially mapped to the comb index '5' of Symbol #C is set to t(0) or t(1), if data transmission is started after lapse of K symbols from the originally intended start time point, sequences t(k) and t(k+1) shifted on the frequency axis can be mapped. In Option 3 of FIG. 16, the SRS transmission start time point may be shifted by 2 symbols, so that t(2) or t(3) may be mapped to the comb index '5' of Symbol #C. Tone shifting on the corresponding frequency axis may be applied only to a specific symbol (e.g., a first transmission symbol), and/or may be applied to all symbols of the transmission SRS. In a situation where the BS receives the PRS transmitted from UE #2 at Symbol #C, if t(0) is mapped to the first comb index '5' and t(1) is mapped to the second comb index '5', this means that transmission of the corresponding SRS is started from Symbol #A. If t(2) is mapped to the first comb index '5' and t(3) is mapped to the second comb index '5', this means that transmission of the corresponding SRS is started from Symbol #C.

[Method #3A-3] SRS transmission (start) time point (or frequency-axis density information of the transmission SRS) for each UE may be signaled through a separate signal/channel. For example, the SRS transmission (start) time point (or frequency-axis density information of the transmission SRS) may be signaled through a preamble or post-amble for each SRS transmission. Alternatively, the SRS transmission start information for each UE may be signaled to the serving cell through a specific DL channel (e.g., PUCCH, PUSCH, or PRACH) of the serving cell.

In the above-described proposed methods, the SRS transmission period may be configured in advance, and may be opportunistically determined according to success or failure of the CAP. When the SRS transmission period is opportunistically determined as described above, beginning of SRS transmission may be signaled through a specific signal/channel (e.g., PUCCH, PUSCH, or PRACH). In addition, a period where opportunistic SRS transmission is allowed for each UE or for each UE group may be configured in advance, and SRS may be aperiodically transmitted within the configured period.

The present disclosure provides a method for transmitting signals/channels for positioning between different transmission (Tx) nodes based on channel occupancy sharing. In this case, channel occupancy sharing may indicate that, when the initiating node occupies the channel during the $T_{ms}$ time (where the T value is determined depending on the CAP parameter value shown in Table 7 and/or Table 8) through the random backoff based CAP, some parts from among the corresponding $T_{ms}$ time can be shared with the responding node. At this time, the responding node is not based on the random backoff based CAP (hereinafter referred to as Type-1 CAP), and has the following advantages (i) and (ii). In the first advantage (i), when the channel is in an idle state for a predetermined time, a CAP (hereinafter referred to as Type-2 CAP) can be performed and associated signals can be transmitted. In the second advantage (ii), regardless of whether a channel is idle or busy, a CAP (hereinafter referred to as Type-3 CAP) can be transmitted and associated signals can be transmitted. Specifically, the present disclosure proposes a method for transmitting and receiving the positioning signal/channel when the initiating node is set to the TRP and the responding node is set to the UE, and a method for transmitting and receiving the positioning signal/channel when the initiating node is set to the UE and the responding node is set to the TRP.

Figure 17:
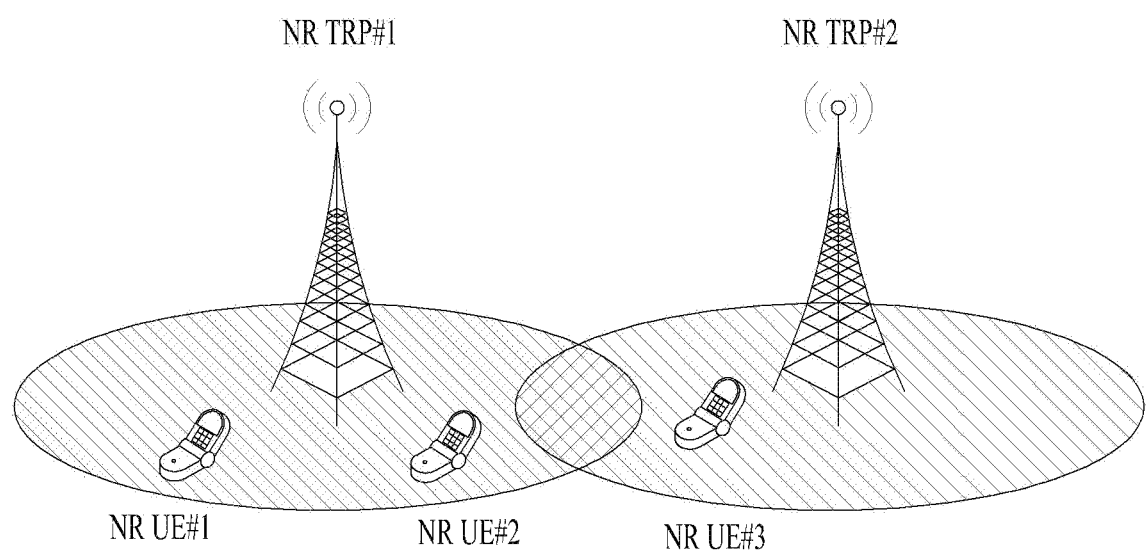
FIG. 17 is a diagram illustrating another example of a system applicable to the embodiments of the present disclosure.

As shown in FIG. 17, UE #1 and UE #2 related to TRP #1 may be used, and UE #3 related to TRP #2 may be used.

Figure 18:
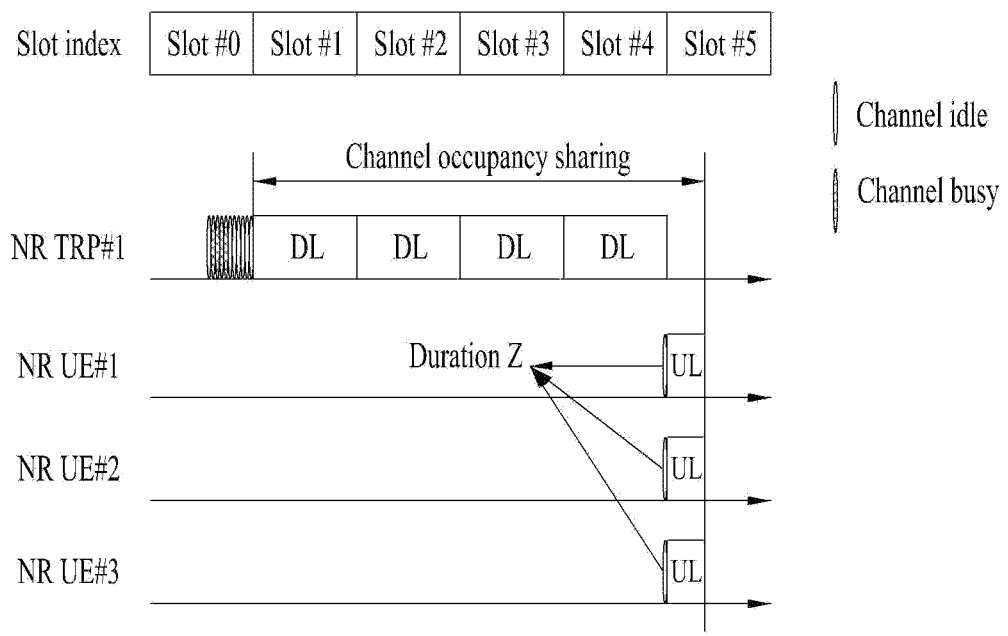
FIG. 18 is a diagram illustrating an example of channel occupancy sharing applicable to the embodiments of the present disclosure.

In this case, when TRP #1 occupies the channel of more than 5 ms after completion of Type-1 CAP as shown in FIG. 18, UE #3 other than UE #1 and UE #2 related to TRP #1 can also perform SRS transmission through channel occupancy sharing. At this time, information about which one of Type-2 CAP and Type-3 CAP will be performed by UE #1, UE #2 and UE #3 for a specific duration (Z) located just before beginning of SRS transmission may be configured in advance, may be RRC-signaled in advance, or may be dynamically indicated by a DL signal/channel on a specific slot from among Slots #1~4. In particular, in order to trigger transmission of UE #3 unrelated to TRP #1, transmission of the cell-common signal/channel or transmission of the cell-group specific signal/channel should be performed in a specific slot/symbol from among DL slots #1~4. UEs related to the TRP belonging to the corresponding cell group through the corresponding cell-common or cell-group specific signal/channel can transmit the SRS serving as a specific power value according to the predefined rule, or can transmit the SRS serving as a specific power value through information included in the corresponding signal/channel.

As an example, each UE may attempt to detect the PRS (belonging to a set of (preconfigured) specific PRSs) during a (preconfigured) specific time period prior to SRS transmission (where the SRS belongs to a set of preconfigured specific PRSs). If PRS detection is successful at Slot #n, SRS transmission may be started at Symbol #m of Slot #n+k. In this case, i) and/or 'm' may be preconfigured, ii) may be signaled at Slot #n (or Slot #n+k1), or iii) other and/or 'm' values may also be configured depending on which one of PRSs was detected. If the corresponding PRS is transmitted from the serving cell (or TRP), TA (or TA=0) configured by the serving cell (or TRP) may be applied to SRS transmission. Alternatively, if the corresponding PRS is not transmitted from the serving cell (or TRP), TA configured by the serving cell (or TRP) or another TA (or TA=0) separately configured may be applied to SRS transmission. In addition, during SRS transmission, transmission (Tx) power may be obtained based on the corresponding PRS received from the serving cell (or TRP). In this case, a power control value configured by the serving cell (or TRP) may be used for SRS transmission. Alternatively, assuming that the corresponding PRS is not transmitted from the serving cell (or TRP), the power control value configured by the serving cell (or TRP) or a separately configured power value (e.g., Pc_max) may also be used for SRS transmission. In addition, the CAP type used in SRS transmission may be set to the Type-3 CAP when the corresponding PRS is transmitted from the serving cell or TRP), so that SRS transmission is then performed using the Type-3 CAP. Alternatively, when the corresponding PRS is not transmitted from the serving cell (or TRP), the CAP type may be set to the Type-2 CAP, so that SRS transmission is then performed using the Type-2 CAP.

In addition, the transmission method based on channel occupancy sharing may also be combined with the cooperative PRS transmission method between TRPs. For example, as shown in FIG. 18, during the transmission period of TRP #1, TRP #2 may attempt to transmit the PRS, and the UE-to-UE channel occupancy sharing method related to TRP #1 and TRP #2 may be applied to such PRS transmission. In addition, the above-mentioned method may also be combined with the UE-to-UE cooperative SRS transmission method. For example, when Type-2 CAP is performed as shown in FIG. 18, the UE fails in this Type-2 CAP, so that the above cooperative transmission method can be applied to this failed UE.

Figure 19:
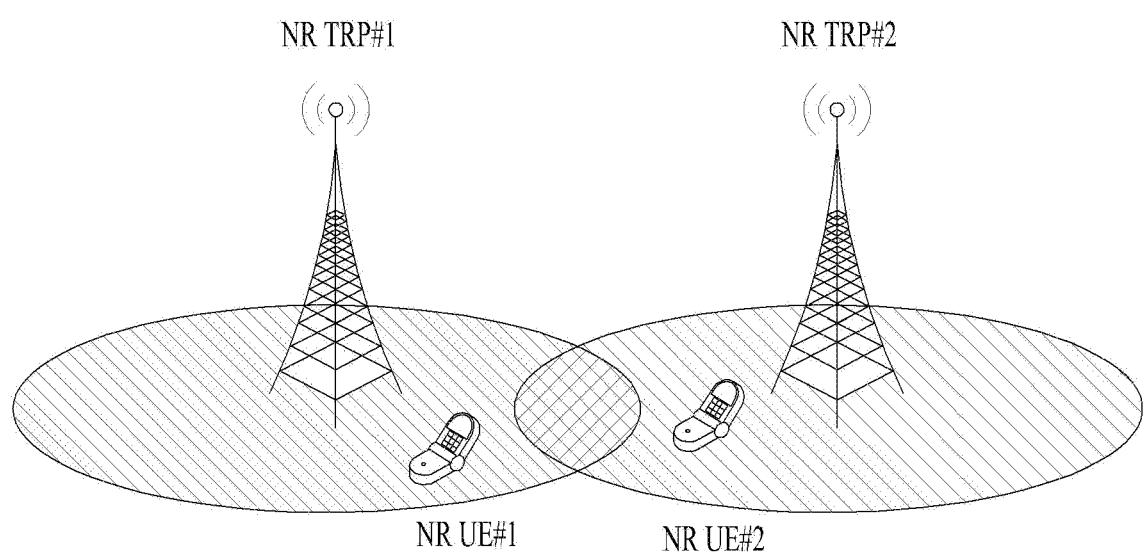
FIG. 19 is a diagram illustrating another example of a system applicable to the embodiments of the present disclosure.

As shown in FIG. 19, UE #1 related to TRP #1 may be present, and UE #2 related to TRP #2 may be present.

Figure 20:
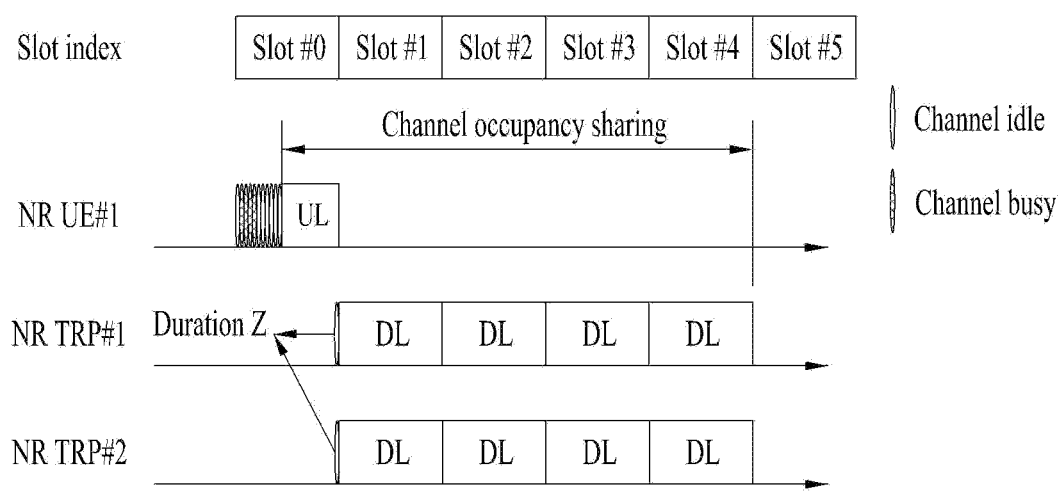
FIG. 20 is a diagram illustrating another example of channel occupancy sharing applicable to the embodiments of the present disclosure.

In this case, when UE #1 occupies the channel of more than 5 ms after execution of the Type-1 CAP as shown in FIG. 20, PRS transmission may be applied not only to TRP #1 that is associated with UE #1 through channel occupancy sharing, but also to TRP #2. In this case, information about which one of Type-2 CAP or Type-3 CAP will be performed by TRP #1 and TRP #2 during the time period Z located just before PRS transmission may be configured in advance, or may be dynamically indicated by SRS (or a separate UL signal/channel). Specifically, in order to trigger data transmission of TRP #2 unrelated to UE #1, SRS (or a separate UL signal/channel) transmission of the cell-common signal/channel or SRS (or a separate UL signal/channel) transmission of the cell-group specific signal/channel should be performed. TRPs related to the TRP belonging to the corresponding cell group through the corresponding cell-common or cell-group specific signal/channel can transmit the PRS according to the predefined rule, or can transmit the PRS through information included in the corresponding signal/channel.

As an example, each BS may attempt to detect the SRS (belonging to a set of (preconfigured) specific SRSs) during a (preconfigured) specific time period prior to PRS transmission (where the PRS belongs to a set of preconfigured specific SRSs). If SRS detection is successful at Slot #n, PRS transmission may be started at Symbol #m of Slot #n+k. In this case, 'k' and/or 'm' may be preconfigured, may be signaled at Slot #n (or Slot #n+k1), or the 'k' and/or 'm' values may also be configured depending on which one of SRSs was detected. The CAP type to be performed in PRS transmission may be set to the Type-3 CAP when the corresponding SRS is transmitted from the served UE, so that PRS transmission is then performed. Alternatively, if the corresponding SRS is not transmitted from the served UE, the CAP type to be performed in PRS transmission may be set to the Type-2 CAP, so that PRS transmission is then performed. During SRS transmission, the UE may select other SRS resources (e.g., frequency resources and/or specific sequence) depending on which cell-group (or TRP-group) will receive the PRS through channel occupancy sharing, or may load necessary information on a separate UL channel, thereby notifying a cell group (or a TRP-group) to be used for UL-to-UL sharing. Therefore, TRPs having received the corresponding SRS may determine whether the corresponding TRP belongs to the corresponding TRP-group, so that each TRP can attempt to perform PRP transmission in the corresponding shared DL resources only when the corresponding TRP belongs to the corresponding TRP-group. When UL-to-DL sharing is attempted only for the serving cell (or TRP), the TA value and/or power value configured by the corresponding cell (or TRP) may be applied to SRS transmission. Alternatively, when UL-to-DL sharing is attempted for the cell (or RP) other than the serving cell (or TRP), a specific TA value (e.g., TA=0) or a specific power value (e.g., P_c,max) may be applied to SRS transmission.

In addition, the transmission method based on channel occupancy sharing may also be combined with the cooperative SRS transmission method between UEs. For example, as shown in FIG. 20, during the transmission period of UE #1, UE #2 may attempt to transmit the SRS, and the TRP-to-TRP channel occupancy sharing method related to UE #1 and UE #2 may be applied to such SRS transmission. In addition, the above-mentioned method may also be combined with the TRP-to-TRP cooperative PRS transmission method. For example, when Type-2 CAP is performed as shown in FIG. 20, the TRP fails in this Type-2 CAP, so that the above cooperative transmission method can be applied to this failed TRP.

The proposed methods of the present disclosure can also be applied to the case where a plurality of CAP-BWs is included in one carrier. Here, CAP-BW may refer to a CAP execution unit where the CAP is performed on the frequency axis. In the present disclosure, CAP-BW may have the same meaning as a resource block (RB) set. The RB set may be configured in the carrier by RRC signaling. If the RB set is not configured in the carrier, the predefined value may be used according to the frequency domain of the carrier. For example, when four CAP-BWs are included in one carrier (or one active bandwidth part), transmission or non-transmission of data can be independently determined according to the CAP result for each CAP-BW. When the BS performs PRS transmission for two CAP-BWs that have successfully performed CAP from among four CAP-BWs, the TRP-to-TRP cooperative PRS transmission method can be applied to two CAP-BWs (or some parts thereof). The above TRP-to-TRP cooperative PRS transmission method can be applied to two CAP-BWs (or some parts thereof). In addition, the above DL-to-UL sharing can also be applied to two CAP-BWs (or some parts thereof). Similarly, when the UE performs SRS transmission for two CAP-BWs that have successfully performed the CAP from among four CAP-BWs, the UE-to-UE cooperative SRS transmission method can be applied to two CAP-BWs (or some parts thereof). The above UL-to-UL cooperative SRS transmission method can be applied to two CAP-BWs (or some parts thereof).

In addition, since examples of the above-described proposals can also be used as implementation methods of the present disclosure, it will also be apparent that the examples of the above-described proposals may be considered to be a kind of proposed methods. Although the above-described proposals can be implemented independently from each other, it should be noted that the above-described proposals can also be implemented as a combination (or a merged format) of some proposals. Rules can be defined in a manner that information about whether the above-described proposed methods are applied (or information about the rules of the proposed methods) can be signaled from the BS to the UE through pre-defined signaling (e.g., physical layer signaling or higher layer signaling).

Figure 21:
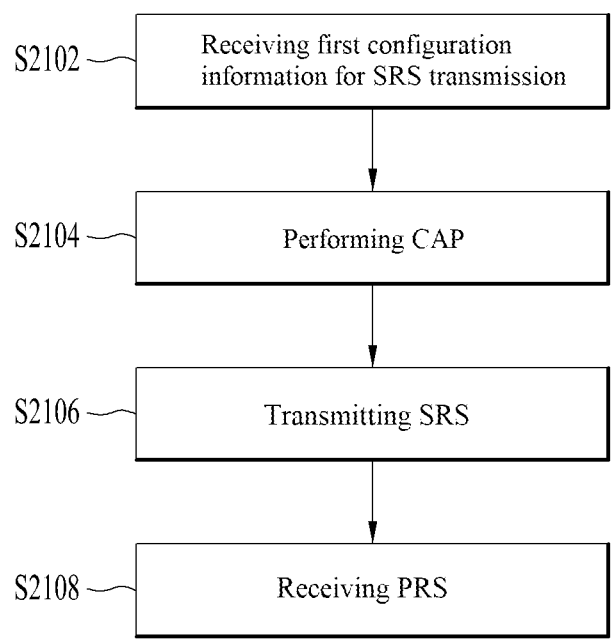
FIGS. 21 to 23 are flowcharts illustrating examples of a signal transmission process according to the embodiments of the present disclosure.
Figure 22:
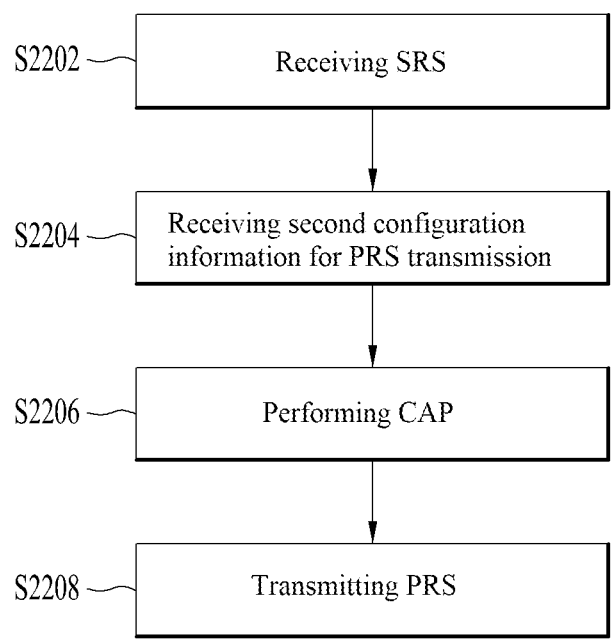
Figure 23:
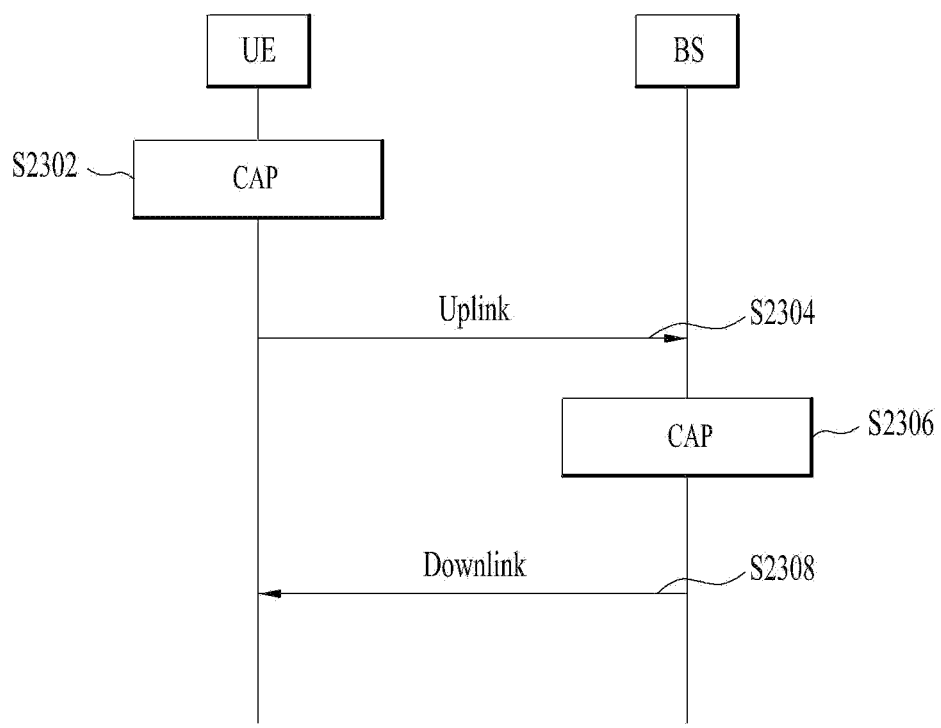

FIGS. 21 to 23 are flowcharts illustrating examples of a signal transmission process according to the embodiments of the present disclosure.

The UE may receive first configuration information for SRS transmission (S2102), and may perform the CAP based on the first configuration information (S2104). The first configuration information may include a start symbol index for SRS transmission. For example, during a specific number of symbols belonging to the specific slot shown in FIG. 16, the first configuration information may include a comb-type SRS configuration in which SRS transmission is configured. Based on the fact that the UE was successful in the CAP at the N-th symbol, the UE may obtain a time period required for the SRS transmission from the N-th symbol, and may then perform SRS in the obtained time period (S2106). The UE may share a channel occupied by the above time period with at least one BS included in the cell group, so that the UE may receive the PRS from the at least one BS during the time period (S2108). The cell group may include a serving cell and a neighboring cell. The UE may include second configuration information for triggering PRS transmission of the at least one BS during the time period. The second configuration information may include a CAP type performed by the at least one BS and information about the length of the time period. Here, the CAP type performed by at least one BS may be configured in advance. On the other hand, if the N-th symbol where the UE was successful in CAP is not identical to a start symbol configured for SRS transmission, that is, if the CAP is successfully performed in a symbol located after the start symbol configured for SRS transmission, there is a need for the UE to inform the BS of the actual transmission start time point. The UE may map a sequence, that is shifted on the frequency axis by a predetermined distance corresponding to a difference between the N value and the start symbol index, to the N-th symbol, so that SRS transmission is then performed.

From the viewpoint of the BS, the BS may receive the SRS from the UE (S2202). In order to perform PRS transmission by sharing the channel occupied by the UE during a time period required for SRS transmission, the BS may receive second configuration information for PRS transmission (S2204). After the BS performs the CAP during the above time period (S2206), the BS may transmit the PRS (S2208).

Referring to FIG. 23, the UE may perform the CAP (S2302), and may perform UL transmission by occupying the channel during a specific time period for UL transmission (S2304). The BS may share the UE-occupied channel, may perform the CAP during the specific time period (S2306), and may perform DL transmission (S2308). In the present disclosure, although UL is an example of SRS and DL is an example of PRS, the scope or spirit of the present disclosure is not limited thereto.

Figure 24:
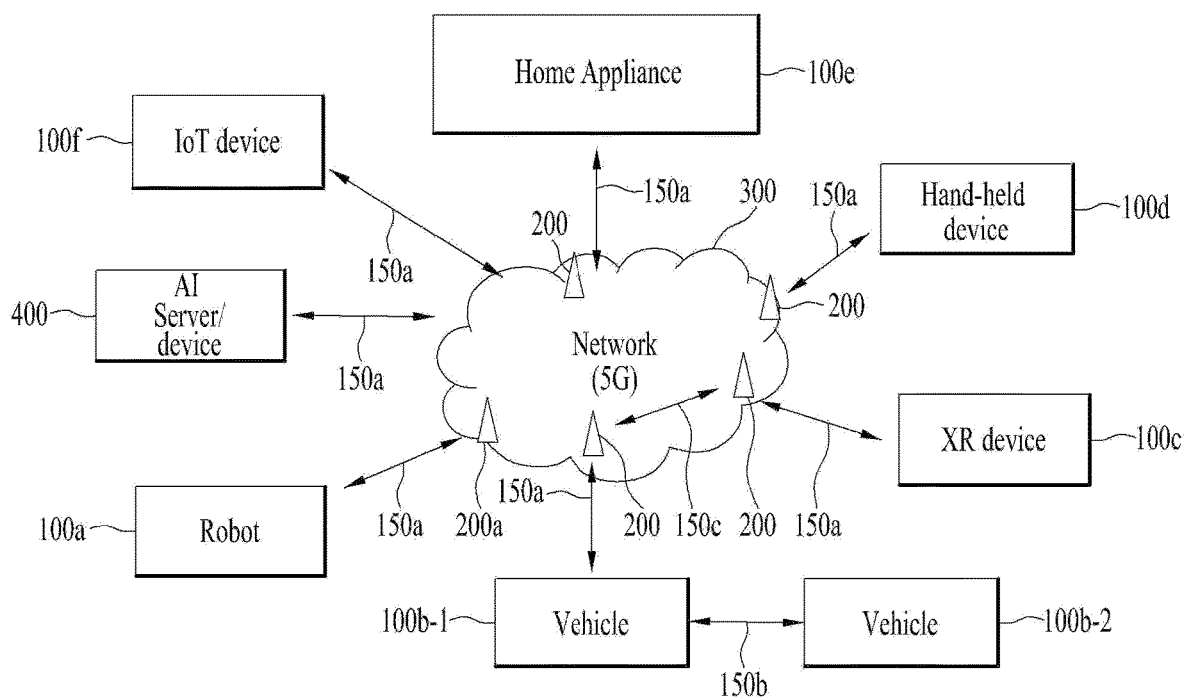
FIG. 24 illustrates an exemplary communication system applied to the present disclosure.

FIG. 24 illustrates a communication system 1 applied to the present disclosure.

Referring to FIG. 24, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smartglasses), and a computer (e.g., a laptop). The home appliance may include a TV, a refrigerator, a washing machine, and so on. The IoT device may include a sensor, a smartmeter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 25:
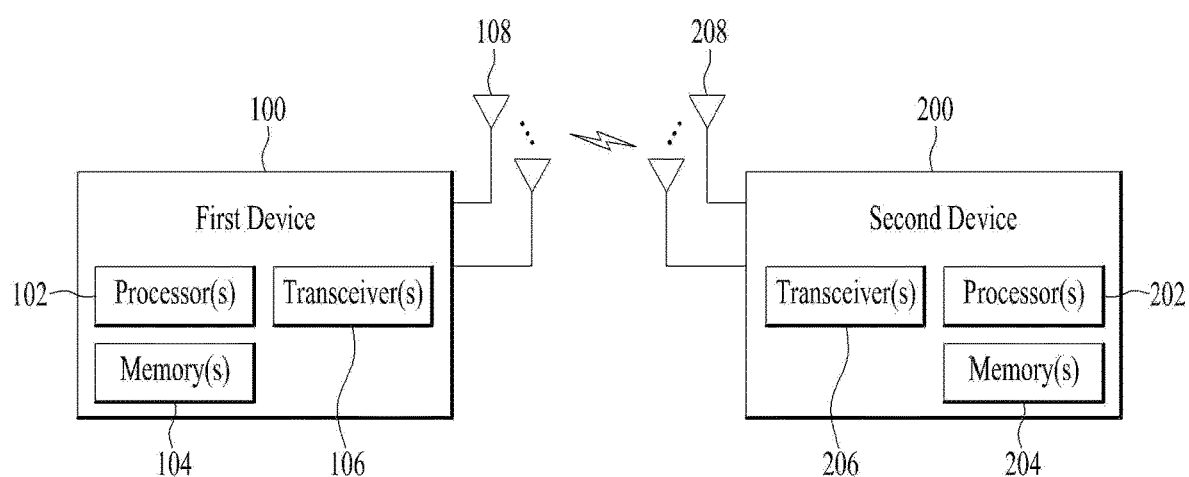
FIG. 25 illustrates an exemplary wireless device applicable to the present disclosure.

FIG. 25 illustrates wireless devices applicable to the present disclosure.

Referring to FIG. 25, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 24.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Figure 26:
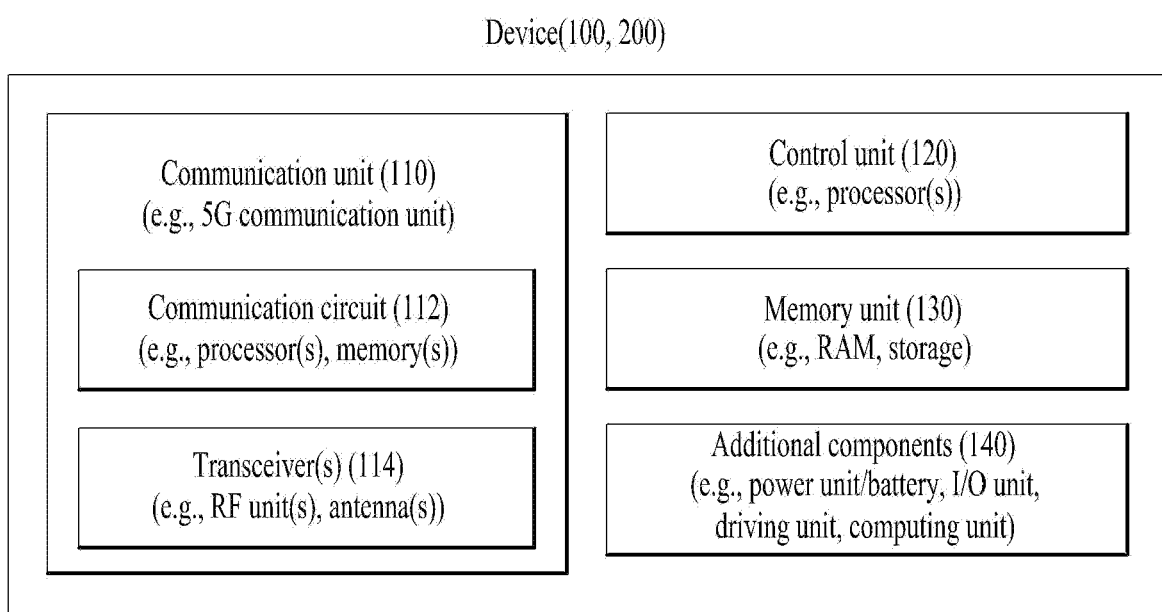
FIG. 26 illustrates another exemplary wireless device applicable to the present disclosure.

FIG. 26 illustrates another example of a wireless device applied to the present disclosure. The wireless device may be implemented in various forms according to a use case/service (refer to FIG. 24).

Referring to FIG. 26, wireless devices 100 and 200 may correspond to the wireless devices 100 and 200 of FIG. 24 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100*a* of FIG. 24), the vehicles (100*b*-1 and 100*b*-2 of FIG. 24), the XR device (100*c* of FIG. 24), the hand-held device (100*d* of FIG. 24), the home appliance (100*e* of FIG. 24), the IoT device (100*f* of FIG. 24), a digital broadcasting terminal, a hologram device, a public safety device, an MTC device, a medical device, a FinTech device (or a finance device), a security device, a climate/environment device, the AI server/device (400 of FIG. 24), the BSs (200 of FIG. 24), a network node, or the like. The wireless device may be mobile or fixed according to a use case/service.

In FIG. 26, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Figure 27:
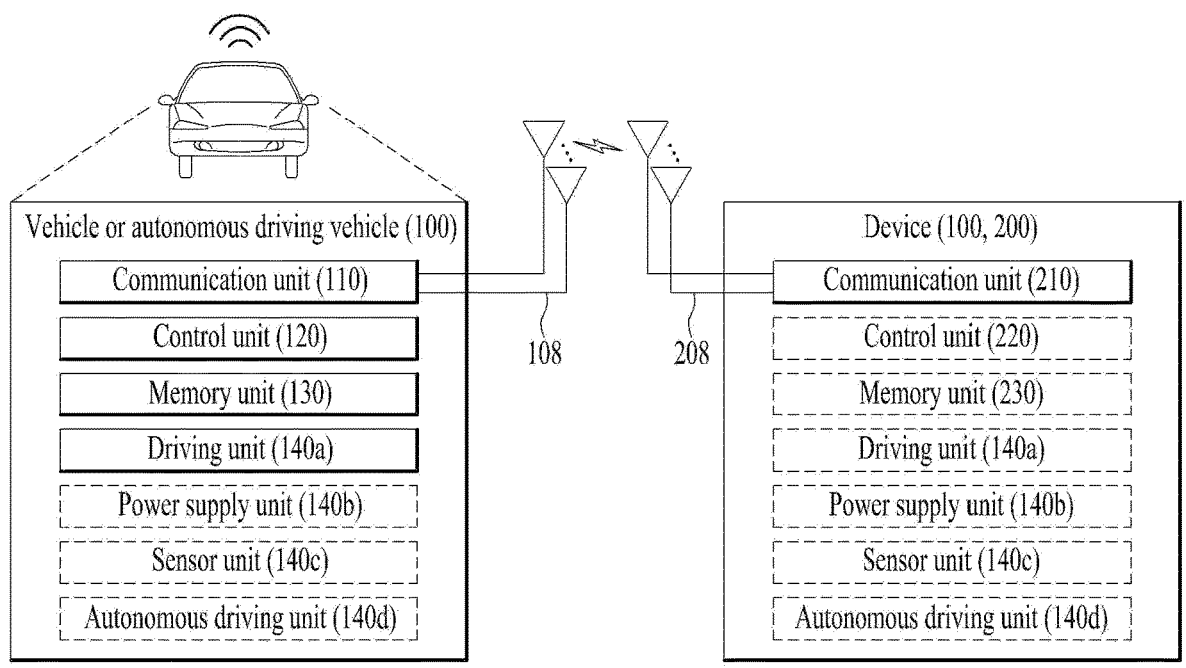
FIG. 27 illustrates an exemplary vehicle or autonomous driving vehicle applicable to the present disclosure.

FIG. 27 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 27, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 24, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

The embodiments of the present disclosure have been described above, focusing on the signal transmission and reception relationship between a UE and a BS. The signal transmission and reception relationship is extended to signal transmission and reception between a UE and a relay or between a BS and a relay in the same manner or a similar manner. A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term fixed station, Node B, enhanced Node B (eNode B or eNB), access point, and so on. Further, the term UE may be replaced with the term terminal, mobile station (MS), mobile subscriber station (MSS), and so on.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is usable for a UE, a BS or other equipments of a wireless mobile communication system.

The invention claimed is:

1. A method of receiving a positioning reference signal (PRS) by a user equipment (UE) in a wireless communication system, the method comprising:
receiving information related to a sounding reference signal (SRS);
determining SRS sequences of the SRS related to a Transmission and Reception Point (TRP) group including a plurality of first TRPs;
performing a channel access procedure (CAP) based on the information related to the SRS;
acquiring Channel Occupancy Time (COT) based on the CAP being sensed as idle;
transmitting, to the plurality of first TRPs and at least one second TRP, the SRS having the SRS sequences; and
receiving, from the plurality of first TRPs among the plurality of first TRPs and the at least one second TRP, PRSs within the COT based on the SRS sequences, wherein the at least one second TRP is not included in the TRP group.

2. The method according to claim 1, wherein the TRP group includes a first TRP having a serving cell and a second TRP having a neighboring cell.

3. The method according to claim 2, wherein transmitting the SRS comprises:
transmitting, to the first TRP, the SRS based on a timing advanced (TA) value received from the serving cell, and
transmitting, to the second TRP, the SRS, the SRS based on a TA value preconfigured for the TRP group.

4. The method according to claim 1, wherein the information includes:
a starting symbol index (M) of the SRS; and
a number (K) of symbols where the SRS transmitted.

5. The method according to claim 4,
wherein based on a value N being greater than the value of M, the SRS sequences are shifted by a value N-M on a frequency axis in the N-th symbol, and
wherein N is a starting symbol index of the COT and is a positive integer.

6. The method according to claim 4,
wherein based on a value N being greater than the value of M, the SRS sequences mapped in an M-th symbol to an (N−1)-th symbol are punctured and the SRS sequences punctured in the M-th symbol to the (N−1)-th symbol are mapped to an (M+K)-th symbol to a (K+N−1)-th symbol, and
wherein N is a starting symbol index of the COT and is a positive integer.

7. A user equipment (UE) of receiving a positioning reference signal (PRS) in a wireless communication system, the UE comprising:
at least one processor;
at least one transceiver; and
at least one computer memory operably connectable to the at least one processor and storing instructions that, when executed by the at least one processor, perform operations comprising:
receiving, through the at least one transceiver, information related to a sounding reference signal (SRS);
determining SRS sequences of the SRS related to a Transmission and Reception Point (TRP) group including a plurality of first TRPs;
performing a channel access procedure (CAP) based on the information related to the SRS;
acquiring Channel Occupancy Time (COT) based on the CAP being sensed as idle;
transmitting, to the plurality of first TRPs and at least one second TRP, the SRS having the SRS sequences, through the at least one transceiver; and
receiving, from the plurality of first TRPs among the plurality of first TRPs and the at least one second TRP, PRSs within the COT based on the SRS sequences, through the at least one transceiver, wherein the at least one second TRP is not included in the TRP group.

8. The UE according to claim 7, wherein the UE is configured to communicate with at least one of a network and another autonomous vehicle other than the UE.

9. A device of receiving a positioning reference signal (PRS) in a wireless communication system, the device comprising:
at least one processor; and
at least one computer memory operably connectable to the at least one processor and storing instructions that, when executed by the at least one processor, perform operations comprising:
receiving information related to a sounding reference signal (SRS);
determining SRS sequences of the SRS related to a Transmission and Reception Point (TRP) group including a plurality of first TRPs;
performing a channel access procedure (CAP) based on the information related to the SRS;
acquiring Channel Occupancy Time (COT) based on the CAP being sensed as idle;
transmitting, to the plurality of first TRPs and at least one second TRP, the SRS having the SRS sequences; and
receiving, from the plurality of first TRPs among the plurality of first TRPs and the at least one second TRP, PRSs within the COT based on the SRS sequences,
wherein the at least one second TRP is not included in the TRP group.

10. A non-transitory computer-readable recording medium configured to store at least one computer program including instructions that enable at least one processor to perform operations by executing the instructions, the operation comprising:
receiving information related to a sounding reference signal (SRS);
determining SRS sequences of the SRS related to a Transmission and Reception Point (TRP) group including a plurality of first TRPs;
performing a channel access procedure (CAP) based on the information related to the SRS;
acquiring Channel Occupancy Time (COT) based on the CAP being sensed as idle;
transmitting, to the plurality of first TRPs and at least one second TRP, the SRS having the SRS sequences; and
receiving, from the plurality of first TRPs among the plurality of first TRPs and the at least one second TRP, PRSs within the COT based on the SRS sequences,
wherein the at least one second TRP is not included in the TRP group.

* * * * *